(12) United States Patent
Tanner

(10) Patent No.: US 12,197,510 B2
(45) Date of Patent: Jan. 14, 2025

(54) TRAVERSAL OF S PORTION OF A GRAPH PROBLEM TO BE SOLVED USING AUTOMATA PROCESSOR

(71) Applicant: Micron Technology, Inc., Boise, ID (US)

(72) Inventor: Jeffery M. Tanner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 480 days.

(21) Appl. No.: 15/692,972

(22) Filed: Aug. 31, 2017

(65) Prior Publication Data

US 2018/0113951 A1  Apr. 26, 2018

Related U.S. Application Data

(60) Provisional application No. 62/410,686, filed on Oct. 20, 2016.

(51) Int. Cl.
| | |
|---|---|
| *G06F 16/903* | (2019.01) |
| *G06F 9/448* | (2018.01) |
| *G06F 16/248* | (2019.01) |
| *G06F 16/901* | (2019.01) |
| *H04L 67/10* | (2022.01) |

(52) U.S. Cl.
CPC ...... *G06F 16/90344* (2019.01); *G06F 9/4498* (2018.02); *G06F 16/248* (2019.01); *G06F 16/9024* (2019.01); *H04L 67/10* (2013.01)

(58) Field of Classification Search
CPC ..... G06F 16/9024; G06F 16/248; H04L 67/10
See application file for complete search history.

(56) References Cited

U.S. PATENT DOCUMENTS

| | | | |
|---|---|---|---|
| 3,849,762 A | 11/1974 | Fujimoto et al. | |
| 3,921,136 A | 11/1975 | Bar-Lev | |
| 4,011,547 A | 3/1977 | Kimmel | |
| 4,014,000 A | 3/1977 | Uno et al. | |
| 4,123,695 A | 10/1978 | Hale et al. | |
| 4,153,897 A | 5/1979 | Yasuda et al. | |
| 4,204,193 A | 5/1980 | Schroeder | |
| 4,414,685 A | 11/1983 | Sternberg | |
| 4,748,674 A | 5/1988 | Freeman | |
| 5,014,327 A | 5/1991 | Potter et al. | |

(Continued)

FOREIGN PATENT DOCUMENTS

| | | |
|---|---|---|
| EP | 0476159 A1 | 3/1992 |
| EP | 0943995 A2 | 9/1999 |

(Continued)

OTHER PUBLICATIONS

Beesley, K. R.; Arabic Morphology Using Only Finite-State Operations; Xerox Research Centre Europe; pp. 50-57; 1998.

(Continued)

*Primary Examiner* — Brittany N Allen
(74) *Attorney, Agent, or Firm* — Fletcher Yoder, P.C.

(57) ABSTRACT

An apparatus includes a state machine engine. The state machine engine may also include an automaton, whereby the automaton is configured to analyze data from a query related to solving a graph. The automaton may further be configured to report an event representative of a satisfaction of a node solving a hop of the graph by a portion of the input data stream.

30 Claims, 12 Drawing Sheets

(56) References Cited

U.S. PATENT DOCUMENTS

| | | |
|---|---|---|
| 5,028,821 A | 7/1991 | Kaplinsky |
| 5,216,748 A | 6/1993 | Quenot et al. |
| 5,257,361 A | 10/1993 | Doi et al. |
| 5,287,523 A | 2/1994 | Allison et al. |
| 5,291,482 A | 3/1994 | McHarg et al. |
| 5,300,830 A | 4/1994 | Hawes |
| 5,331,227 A | 7/1994 | Hawes |
| 5,357,512 A | 10/1994 | Khaira et al. |
| 5,371,878 A | 12/1994 | Coker |
| 5,377,129 A | 12/1994 | Molvig et al. |
| 5,459,798 A | 10/1995 | Bailey et al. |
| 5,615,237 A | 3/1997 | Chang et al. |
| 5,659,551 A | 8/1997 | Huott et al. |
| 5,723,984 A | 3/1998 | Sharpe-Geisler |
| 5,754,878 A | 5/1998 | Asghar et al. |
| 5,790,531 A | 8/1998 | Ellebracht et al. |
| 5,881,312 A | 3/1999 | Dulong |
| 5,896,548 A | 4/1999 | Ofek |
| 5,956,741 A | 9/1999 | Jones |
| 6,011,407 A | 1/2000 | New |
| 6,016,361 A | 1/2000 | Hongu et al. |
| 6,034,963 A | 3/2000 | Minami et al. |
| 6,041,405 A | 3/2000 | Green |
| 6,052,766 A | 4/2000 | Betker et al. |
| 6,058,469 A | 5/2000 | Baxter |
| 6,094,443 A * | 7/2000 | Dwork .............. G06F 7/02 370/510 |
| 6,151,644 A | 11/2000 | Wu |
| 6,240,003 B1 | 5/2001 | McElroy |
| 6,279,128 B1 | 8/2001 | Arnold et al. |
| 6,295,367 B1 * | 9/2001 | Crabtree .............. G01S 3/7865 382/103 |
| 6,317,427 B1 | 11/2001 | Augusta et al. |
| 6,362,868 B1 | 3/2002 | Silverbrook |
| 6,400,996 B1 | 6/2002 | Hoffberg et al. |
| 6,606,699 B2 | 8/2003 | Pechanek et al. |
| 6,614,703 B2 | 9/2003 | Pitts et al. |
| 6,625,740 B1 | 9/2003 | Datar et al. |
| 6,633,443 B1 | 10/2003 | Watanabe et al. |
| 6,636,483 B1 | 10/2003 | Pannell |
| 6,640,262 B1 | 10/2003 | Uppunda et al. |
| 6,697,979 B1 | 2/2004 | Vorbach et al. |
| 6,700,404 B1 | 3/2004 | Feng et al. |
| 6,880,087 B1 | 4/2005 | Carter |
| 6,906,938 B2 | 6/2005 | Kaginele |
| 6,944,710 B2 | 9/2005 | Regev et al. |
| 6,971,058 B2 * | 11/2005 | Evans .............. G06F 7/02 714/758 |
| 6,977,897 B1 | 12/2005 | Nelson et al. |
| 7,010,639 B2 | 3/2006 | Larson et al. |
| 7,089,352 B2 | 8/2006 | Regev et al. |
| 7,146,643 B2 | 12/2006 | Dapp et al. |
| 7,176,717 B2 | 2/2007 | Sunkavalli et al. |
| 7,276,934 B1 | 10/2007 | Young |
| 7,305,047 B1 | 12/2007 | Turner |
| 7,358,761 B1 | 4/2008 | Sunkavalli et al. |
| 7,366,352 B2 | 4/2008 | Kravec et al. |
| 7,392,229 B2 | 6/2008 | Harris et al. |
| 7,428,722 B2 | 9/2008 | Sunkavalli et al. |
| 7,487,131 B2 | 2/2009 | Harris et al. |
| 7,487,542 B2 | 2/2009 | Boulanger et al. |
| 7,499,464 B2 | 3/2009 | Ayrapetian et al. |
| 7,565,380 B1 * | 7/2009 | Venkatachary ... G06F 16/90344 707/999.102 |
| 7,725,510 B2 | 5/2010 | Alicherry et al. |
| 7,774,286 B1 | 8/2010 | Harris |
| 7,804,719 B1 | 9/2010 | Chirania et al. |
| 7,890,923 B2 | 2/2011 | Elaasar |
| 7,899,052 B1 | 3/2011 | Hao et al. |
| 7,917,684 B1 | 3/2011 | Noyes et al. |
| 7,970,964 B2 | 6/2011 | Noyes |
| 8,015,530 B1 | 9/2011 | Sinclair et al. |
| 8,020,131 B1 | 9/2011 | Van Mau et al. |
| 8,065,249 B1 | 11/2011 | Harris et al. |
| 8,140,780 B2 | 3/2012 | Noyes |
| 8,146,040 B1 | 3/2012 | Janneck et al. |
| 8,159,900 B2 | 4/2012 | Moore et al. |
| 8,209,521 B2 | 6/2012 | Noyes et al. |
| 8,239,660 B2 | 8/2012 | Cervini |
| 8,281,395 B2 | 10/2012 | Pawlowski |
| 8,294,490 B1 | 10/2012 | Kaviani |
| 8,402,188 B2 | 3/2013 | Noyes et al. |
| 8,536,896 B1 | 9/2013 | Trimberger |
| 8,593,175 B2 | 11/2013 | Noyes et al. |
| 8,648,621 B2 | 2/2014 | Noyes et al. |
| 8,680,888 B2 | 3/2014 | Brown et al. |
| 8,725,961 B2 | 5/2014 | Noyes |
| 8,782,624 B2 | 7/2014 | Brown et al. |
| 8,938,590 B2 | 1/2015 | Noyes et al. |
| 9,058,465 B2 | 6/2015 | Noyes et al. |
| 9,063,532 B2 | 6/2015 | Brown |
| 9,075,428 B2 | 7/2015 | Brown |
| 9,118,327 B2 | 8/2015 | Noyes et al. |
| 9,235,798 B2 | 1/2016 | Brown et al. |
| 2001/0033548 A1 * | 10/2001 | Saleh .............. H04L 45/22 370/218 |
| 2002/0186044 A1 | 12/2002 | Agrawal et al. |
| 2003/0107996 A1 | 6/2003 | Black et al. |
| 2003/0142698 A1 | 7/2003 | Parhl |
| 2003/0163615 A1 | 8/2003 | Yu |
| 2003/0226002 A1 | 12/2003 | Boutaud et al. |
| 2004/0100980 A1 | 5/2004 | Jacobs et al. |
| 2004/0125807 A1 | 7/2004 | Liu et al. |
| 2004/0151211 A1 | 8/2004 | Snider |
| 2004/0184662 A1 | 9/2004 | Kravec et al. |
| 2005/0154916 A1 | 7/2005 | Boulanger et al. |
| 2005/0251638 A1 | 11/2005 | Boutaud et al. |
| 2006/0158219 A1 | 7/2006 | Sunkavalli et al. |
| 2006/0184471 A1 * | 8/2006 | Minamino ............ G10L 15/144 704/E15.029 |
| 2006/0195496 A1 | 8/2006 | Vadi et al. |
| 2006/0206875 A1 | 9/2006 | Ullmann et al. |
| 2006/0257043 A1 | 11/2006 | Chiu |
| 2006/0274001 A1 | 12/2006 | Guttag et al. |
| 2006/0288070 A1 | 12/2006 | Vadi et al. |
| 2007/0005869 A1 | 1/2007 | Balraj et al. |
| 2007/0075878 A1 | 4/2007 | Furodet et al. |
| 2007/0127482 A1 | 6/2007 | Harris et al. |
| 2007/0150623 A1 | 6/2007 | Kravec et al. |
| 2007/0282833 A1 | 12/2007 | McMillen |
| 2007/0283108 A1 | 12/2007 | Isherwood et al. |
| 2008/0101371 A1 * | 5/2008 | Law .............. H04L 69/22 370/392 |
| 2008/0126690 A1 | 5/2008 | Rajan et al. |
| 2008/0129334 A1 | 6/2008 | Sunkavalli et al. |
| 2008/0133874 A1 | 6/2008 | Capek et al. |
| 2008/0140661 A1 | 6/2008 | Pandya |
| 2008/0155239 A1 * | 6/2008 | Chowdhury ........ G06F 15/7842 235/487 |
| 2008/0178031 A1 | 7/2008 | Kim |
| 2008/0256347 A1 | 10/2008 | Eickemeyer et al. |
| 2008/0320053 A1 | 12/2008 | IIjima et al. |
| 2009/0198952 A1 | 8/2009 | Khmelnitsky et al. |
| 2009/0204734 A1 | 8/2009 | Strait et al. |
| 2010/0100691 A1 | 4/2010 | Noyes et al. |
| 2010/0100714 A1 | 4/2010 | Noyes et al. |
| 2010/0115173 A1 | 5/2010 | Noyes |
| 2010/0115347 A1 | 5/2010 | Noyes |
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0145182 A1 | 6/2010 | Schmidt et al. |
| 2010/0174887 A1 | 7/2010 | Pawlowski |
| 2010/0174929 A1 | 7/2010 | Pawlowski |
| 2010/0175130 A1 | 7/2010 | Pawlowski |
| 2010/0185647 A1 | 7/2010 | Noyes |
| 2010/0228918 A1 * | 9/2010 | Vorbach ............ G06F 8/433 711/118 |
| 2010/0229040 A1 * | 9/2010 | Chen .............. G06F 16/3331 714/E11.029 |
| 2010/0325352 A1 | 12/2010 | Schuette et al. |
| 2010/0332809 A1 | 12/2010 | Noyes et al. |

(56) References Cited

U.S. PATENT DOCUMENTS

| | | | |
|---|---|---|---|
| 2011/0004578 | A1 | 1/2011 | Momma et al. |
| 2011/0145182 | A1 | 6/2011 | Dlugosch et al. |
| 2011/0145271 | A1 | 6/2011 | Noyes et al. |
| 2011/0145544 | A1 | 6/2011 | Noyes et al. |
| 2011/0161620 | A1 | 6/2011 | Kaminski et al. |
| 2011/0208900 | A1 | 8/2011 | Schuette et al. |
| 2011/0258360 | A1 | 10/2011 | Noyes |
| 2011/0307233 | A1* | 12/2011 | Tseng ................ G06F 17/5022 703/14 |
| 2011/0307433 | A1 | 12/2011 | Dlugosch |
| 2011/0307503 | A1 | 12/2011 | Dlugosch |
| 2011/0320759 | A1 | 12/2011 | Craddock et al. |
| 2012/0179854 | A1 | 7/2012 | Noyes |
| 2012/0192163 | A1* | 7/2012 | Glendenning ...... G06F 17/5045 717/143 |
| 2012/0192164 | A1 | 7/2012 | Xu et al. |
| 2012/0192165 | A1 | 7/2012 | Xu et al. |
| 2012/0192166 | A1* | 7/2012 | Xu ........................ G06F 9/4498 717/149 |
| 2013/0154685 | A1 | 6/2013 | Noyes |
| 2013/0156043 | A1 | 6/2013 | Brown et al. |
| 2013/0159239 | A1 | 6/2013 | Brown et al. |
| 2013/0159670 | A1 | 6/2013 | Noyes |
| 2013/0159671 | A1 | 6/2013 | Brown et al. |
| 2013/0275709 | A1 | 10/2013 | Gajapathy |
| 2014/0025614 | A1 | 1/2014 | Noyes et al. |
| 2014/0025923 | A1 | 1/2014 | Klein |
| 2014/0067736 | A1* | 3/2014 | Noyes .................. G06F 1/3206 706/20 |
| 2014/0068167 | A1* | 3/2014 | Brown ................. G05B 19/045 711/105 |
| 2014/0204956 | A1 | 7/2014 | Brown et al. |
| 2014/0225889 | A1 | 8/2014 | Kim et al. |
| 2014/0279776 | A1* | 9/2014 | Brown .................. G06F 9/4498 706/20 |
| 2014/0325494 | A1 | 10/2014 | Brown et al. |
| 2015/0286748 | A1* | 10/2015 | Lilley ..................... G06F 16/28 707/794 |
| 2017/0277811 | A1* | 9/2017 | Mistry ................ G06F 16/9027 |
| 2018/0330008 | A1* | 11/2018 | Fan ..................... G06F 16/9024 |
| 2018/0365289 | A1* | 12/2018 | Brown .............. G06F 16/24535 |

FOREIGN PATENT DOCUMENTS

| | | | |
|---|---|---|---|
| JP | 08087462 | A | 4/1996 |
| JP | 10069459 | A | 3/1998 |
| JP | 10111862 | A | 4/1998 |
| JP | 2000231549 | A | 8/2000 |
| JP | 2000347708 | A | 12/2000 |
| KR | 1020080097573 | A | 11/2008 |
| WO | WO0065425 | A1 | 11/2000 |
| WO | WO0138978 | A1 | 5/2001 |
| WO | WO03039001 | A1 | 5/2003 |
| WO | WO2005036750 | A1 | 4/2005 |
| WO | WO2011114120 | A1 | 9/2011 |

OTHER PUBLICATIONS

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE International Conference on Field Programmable Technology; 2006.

Bispo, J. et al.; Synthesis of Regular Expressions Targeting FPGAs: Current Status and Open Issues; IST/INESC-ID, Libson, Portugal; pp. 1-12; 2007.

Brodie, B. et al.; A scalable Architecture for High-Throughput Regular-Expression Pattern Matching; Exegy Inc.; pp. 1-12; 2006.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17; 2005.

Fide, S.; String Processing in Hardware; Scalable Parallel and Distributed Systems Lab; Proceedings of the $12^{th}$ Annual IEEE symposium on Field-Programmable Custom Computing Machines (FCCM'04); School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21; 2002.

Korenek, J.; Traffic Scanner-Hardware Accelerated Intrusion Detection System; http://www.liberouter.org/ ; 2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12; 2001.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky ® Accelerated Antivirus Solution Platform for OEM Vendors; Freescale Semiconductors Document; pp. 1-16; 2007.

PCT/US2009/067534 International Search Report and Written Opinion Apr. 26, 2010.

PCT/US2009/061649 International Search Report Feb. 15, 2010.

Taiwan Application No. 098144804 Office Action dated Nov. 4, 2013.

PCT/US2012/067992 International Search Report Mar. 28, 2013.

PCT/US2012/068011 International Search Report Apr. 15, 2013.

PCT/US2012/067999 International Search Report May 14, 2013.

PCT/US2012/067995 International Search Report May 17, 2013.

PCT/US2012/067988 International Search Report (Partial) Jun. 24, 2014.

PCT/US2013/049744 International Search Report and Written Opinion Oct. 22, 2013.

PCT/US2013/049748 International Search Report and Written Opinion Oct. 22, 2013.

PCT/US2013/049755 International Search Report and Written Opinion Oct. 24, 2013.

PCT/US2013/049753 International Search Report and Written Opinion Nov. 7, 2013.

PCT/US2013/055434 International Search Report and Written Opinion Nov. 29, 2013.

PCT/US2013/055438 International Search Report and Written Opinion Nov. 29, 2013.

PCT/US2013/055436 International Search Report and Written Opinion Dec. 9, 2013.

(56) References Cited

OTHER PUBLICATIONS

PCT/US2014/023589 International Search Report and Written Opinion Jul. 24, 2014.
Soewito et al., "Self-Addressable Memory-Based FSM: A scalable Intrusion Detection Engine", IEEE Network, pp. 14-21; Feb. 2009.
Hurson A. R.; A VLSI Design for the Parallel Finite State Automation and Its Performance Evaluation as a Hardware Scanner; International Journal of Computer and Information Sciences, vol. 13, No. 6; 1984.
Carpenter et al., "A Massively Parallel Architecture for a Self-Organizing Neural Pattern Recognition Machine", Academic Press, Inc.; 1987.
Cong et al., "Application-Specific Instruction Generation for Configurable Processor Architectures", Computer Science Department, University of California, ACM; 2004.
Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial At ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
Roy et al., "Finding Motifs in Biological Sequences using the Micron Automata Processor," IEEE, 2014.
U.S. Appl. No. 60/652,738, filed Feb. 12, 2005, Harris.
U.S. Appl. No. 61/788,364, filed Mar. 15, 2013, Brown.

* cited by examiner

TRAVERSAL OF S PORTION OF A GRAPH PROBLEM TO BE SOLVED USING AUTOMATA PROCESSOR

CROSS REFERENCE TO RELATED APPLICATIONS

This application is a Non-Provisional application claiming priority to U.S. Provisional Patent Application No. 62/410,686, entitled "Graph Traversal Using Automata Processor", filed Oct. 20, 2016, which is herein incorporated by reference.

BACKGROUND

Field of Invention

Embodiments relate generally to electronic devices and, more specifically, in certain embodiments, to electronic devices with parallel devices for data analysis.

Description of Related Art

Complex pattern recognition can be inefficient to perform on a conventional von Neumann based computer. A biological brain, in particular a human brain, however, is adept at performing pattern recognition. Current research suggests that a human brain performs pattern recognition using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex pattern recognition that enables humans to perform high level functions such as spatial reasoning, conscious thought, and complex language.

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. The system may then further process the results from these circuits, to arrive at the final results. These "intermediate results", however, can be larger than the original input data, which may pose issues for the system. The ability to use a cascaded circuits approach, similar to the human brain, offers one potential solution to this problem. However, there has not been a system that effectively allows for performing pattern recognition in a manner more comparable to that of a biological brain. Development of such a system is desirable.

DETAILED DESCRIPTION

Figure 1:
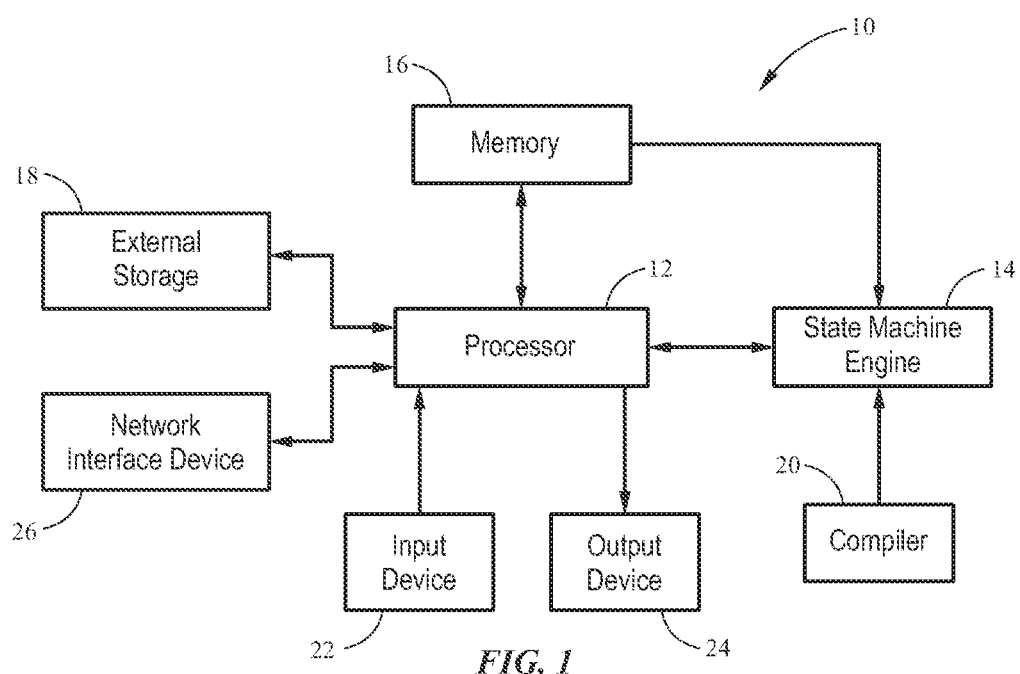
FIG. 1 illustrates an example of system having a state machine engine, according to various embodiments.

Turning now to the figures, FIG. 1 illustrates an embodiment of a processor-based system, generally designated by reference numeral 10. It should be noted that as used in the present application, an apparatus may be a device or a system. The system 10 may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. Alternatively, the system 10 may be separate from and coupled to the state machine engine 14, with the state machine engine 14 operating under control of the separate system 10 and, more particularly, a processor 12 therein. The state machine engine 14 may employ any one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition or other processing) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, issue, route, send, transfer, transmit, generate, give, make available, move, output, pass, place, read out, write, etc. Such devices may be referred to as or include solid state drives (SSDs), MultimediaMediaCards (MMCs), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state transition elements (STEs) 34, 36 (shown in FIG. 5) that are hierarchically organized into rows 38 (shown in FIGS. 3 and 4) and blocks 32 (shown in FIGS. 2 and 3). The STEs each may be considered an automaton, e.g., a machine or control mechanism designed to follow automatically a predetermined sequence of operations or respond to encoded instructions. Taken together, the STEs form an automata processor as state machine engine 14. To route signals between the hierarchically organized STEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A STE 34, 36 can correspond to a state of a FSM implemented by the FSM lattice 30. The STEs 34, 36 can be coupled together by using the configurable switching elements as described below. Accordingly, a FSM can be implemented on the FSM lattice 30 by configuring the STEs 34, 36 to correspond to the functions of states and by selectively coupling together the STEs 34, 36 to correspond to the transitions between states in the FSM.

Figure 2:
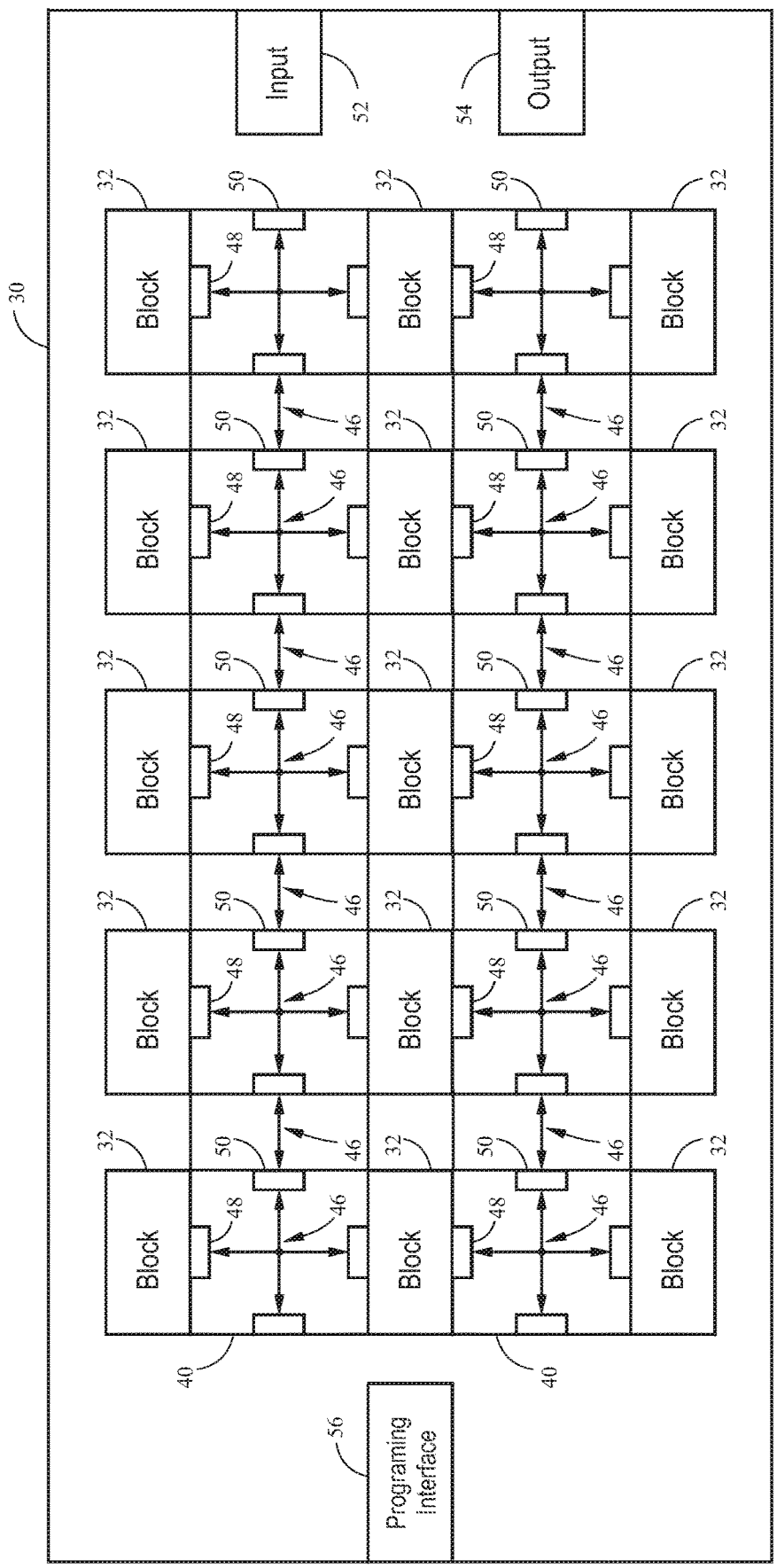
FIG. 2 illustrates an example of an FSM lattice of the state machine engine of FIG. 1, according to various embodiments.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48, 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the STEs 34, 36. For example, the image can configure the STEs 34, 36 to react in a certain way to a given input at the input block 52. For example, a STE 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the STEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
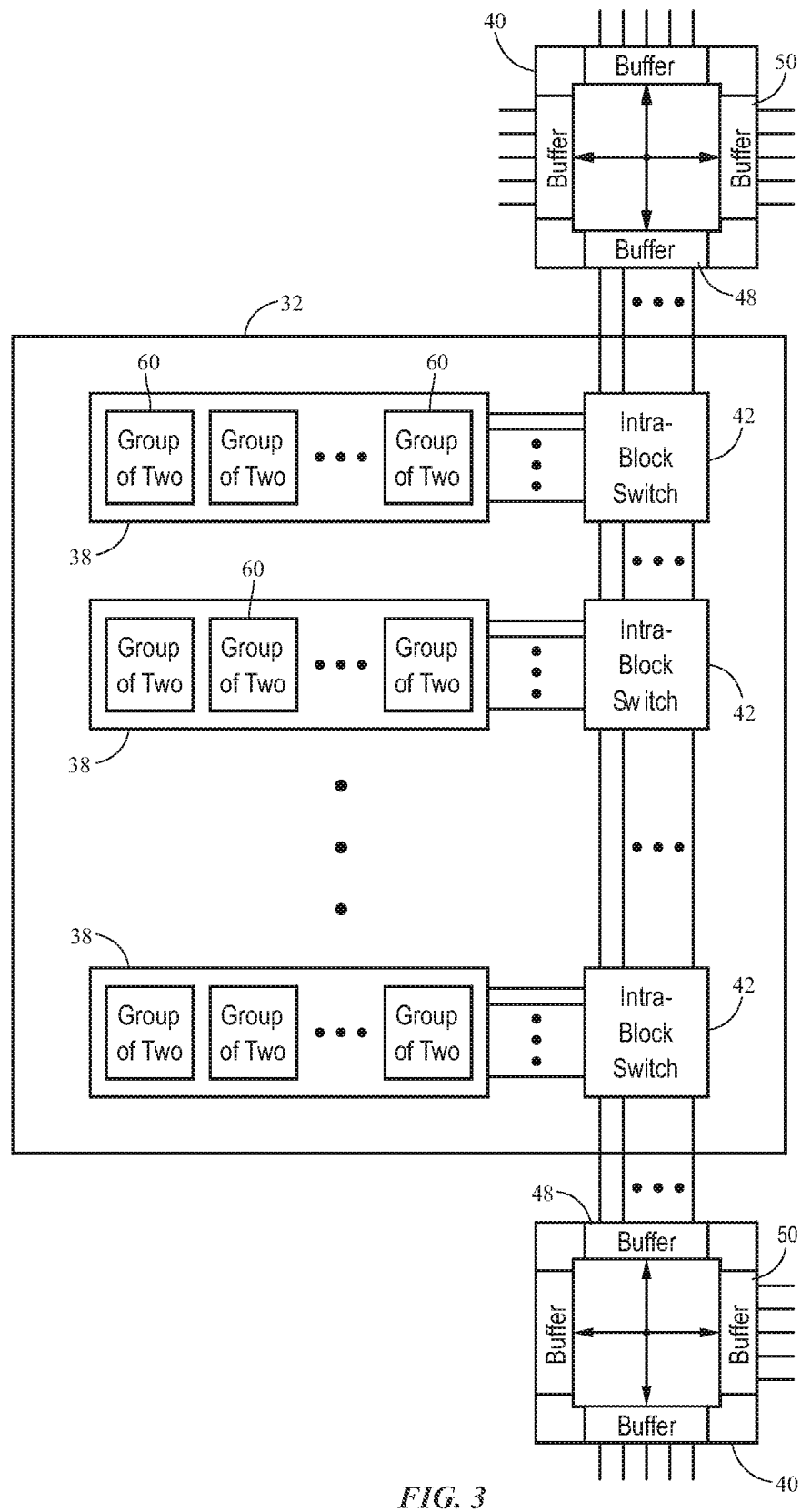
FIG. 3 illustrates an example of a block of the FSM lattice of FIG. 2, according to various embodiments.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of STEs 34, 36 organized into pairs of elements that are referred to herein as groups of two (GOTs) 60. In an example, a block 32 comprises sixteen (16) rows 38.

Figure 4:
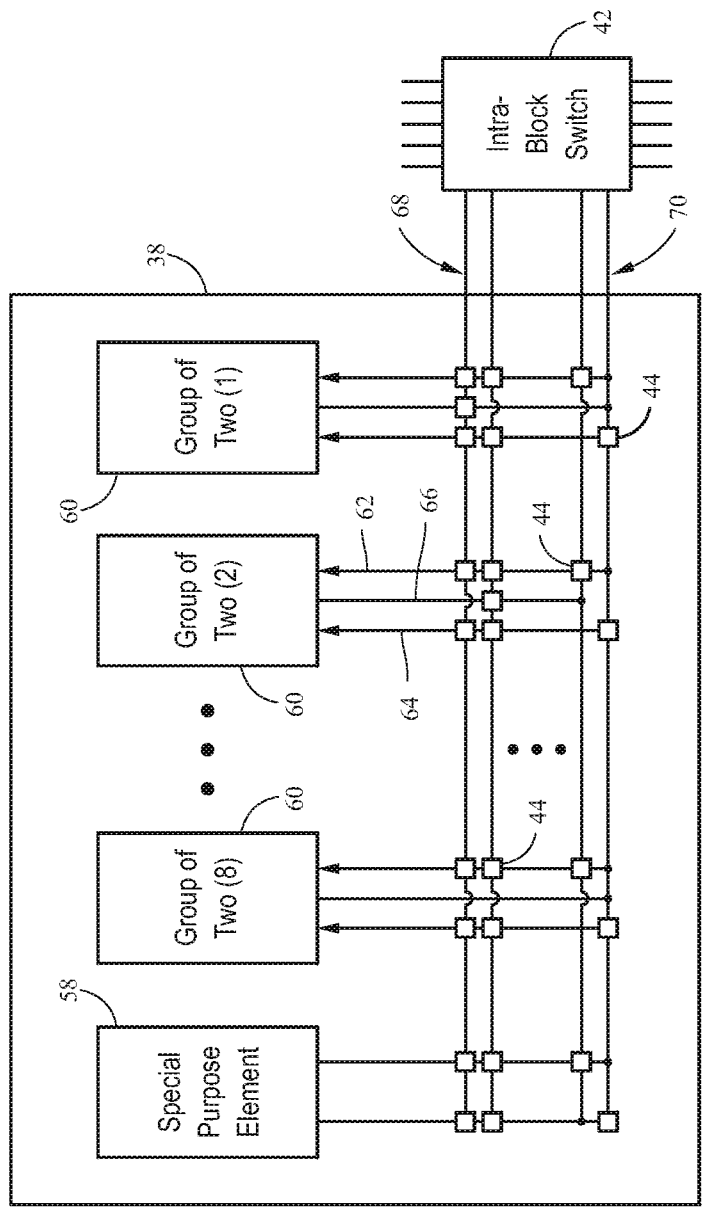
FIG. 4 illustrates an example of a row of the block of FIG. 3, according to various embodiments.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first STE 34 of the GOT 60 and the second input 64 is coupled to a second STE 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each STE 34, 36 of each GOT 60 within the row 38. A second plurality of the row interconnection conductors 70 can be coupled to only one STE 34, 36 of each GOT 60 within the row 38, but cannot be coupled to the other STE 34, 36 of the GOT 60. In an example, a first half of the second plurality of row interconnection conductors 70 can couple to first half of the STEs 34, 36 within a row 38 (one STE 34 from each GOT 60) and a second half of the second plurality of row interconnection conductors 70 can couple to a second half of the STEs 34, 36 within a row 38 (the other STE 34, 36 from each GOT 60), as will be better illustrated with respect to FIG. 5. The limited connectivity between the second plurality of row interconnection conductors 70 and the STEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero. For example, the zero-count output is asserted during the processing of an immediately subsequent next data byte, which results in the counter 58 being offset in time with respect to the input character cycle. After the next character cycle, the zero-count output is no longer asserted. In this manner, for example, in the pulse mode, the zero-count output is asserted for one input character processing cycle. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sum (NPoS), and Product of Sums (PoS) functions. This Boolean logic can be used to extract data from terminal state STEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 4A:
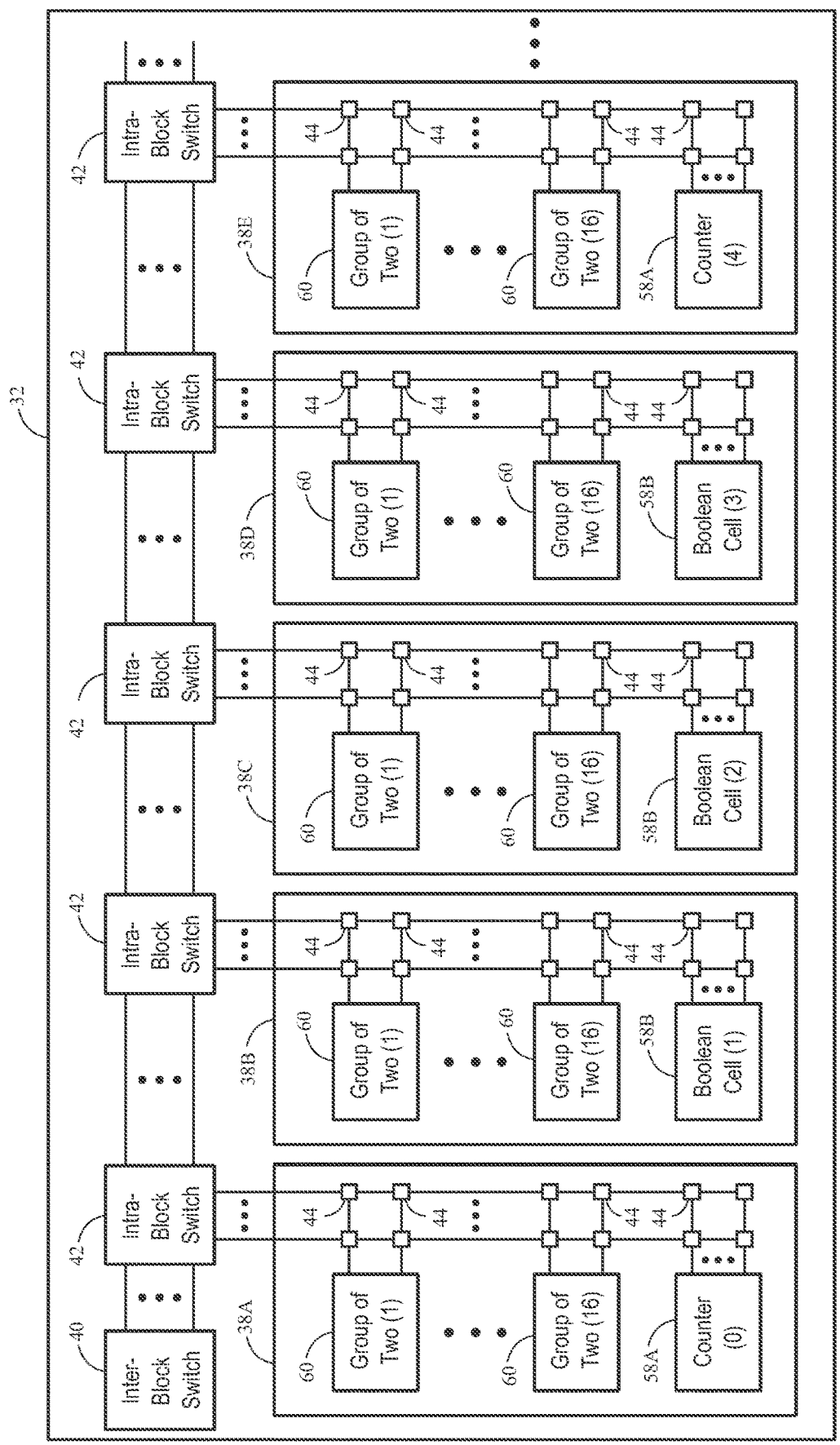
FIG. 4A illustrates a block as in FIG. 3 having counters in rows of the block, according to various embodiments of the invention.

FIG. 4A is an illustration of an example of a block 32 having rows 38 which each include the special purpose element 58. For example, the special purpose elements 58 in the block 32 may include counter cells 58A and Boolean logic cells 58B. While only the rows 38 in row positions 0 through 4 are illustrated in FIG. 4A (e.g., labeled 38A through 38E), each block 32 may have any number of rows 38 (e.g., 16 rows 38), and one or more special purpose elements 58 may be configured in each of the rows 38. For example, in one embodiment, counter cells 58A may be configured in certain rows 38 (e.g., in row positions 0, 4, 8, and 12), while the Boolean logic cells 58B may be configured in the remaining of the 16 rows 38 (e.g., in row positions 1, 2, 3, 5, 6, 7, 9, 10, 11, 13, 14, 15, and 16). The GOT 60 and the special purpose elements 58 may be selectively coupled (e.g., selectively connected) in each row 38 through intra-row switching elements 44, where each row 38 of the block 32 may be selectively coupled with any of the other rows 38 of the block 32 through intra-block switching elements 42.

In some embodiments, each active GOT 60 in each row 38 may output a signal indicating whether one or more conditions are detected (e.g., a search result is detected), and the special purpose element 58 in the row 38 may receive the GOT 60 output to determine whether certain quantifiers of the one or more conditions are met and/or count a number of times a condition is detected. For example, quantifiers of a count operation may include determining whether a condition was detected at least a certain number of times, determining whether a condition was detected no more than a certain number of times, determining whether a condition was detected exactly a certain number of times, and determining whether a condition was detected within a certain range of times.

Outputs from the counter 58A and/or the Boolean logic cell 58B may be communicated through the intra-row switching elements 44 and the intra-block switching elements 42 to perform counting or logic with greater complexity. For example, counters 58A may be configured to implement the quantifiers, such as asserting an output only when a condition is detected an exact number of times. Counters 58A in a block 32 may also be used concurrently, thereby increasing the total bit count of the combined counters to count higher numbers of a detected condition. Furthermore, in some embodiments, different special purpose elements 58 such as counters 58A and Boolean logic cells 58B may be used together. For example, an output of one or more Boolean logic cells 58B may be counted by one or more counters 58A in a block 32.

Figure 5:
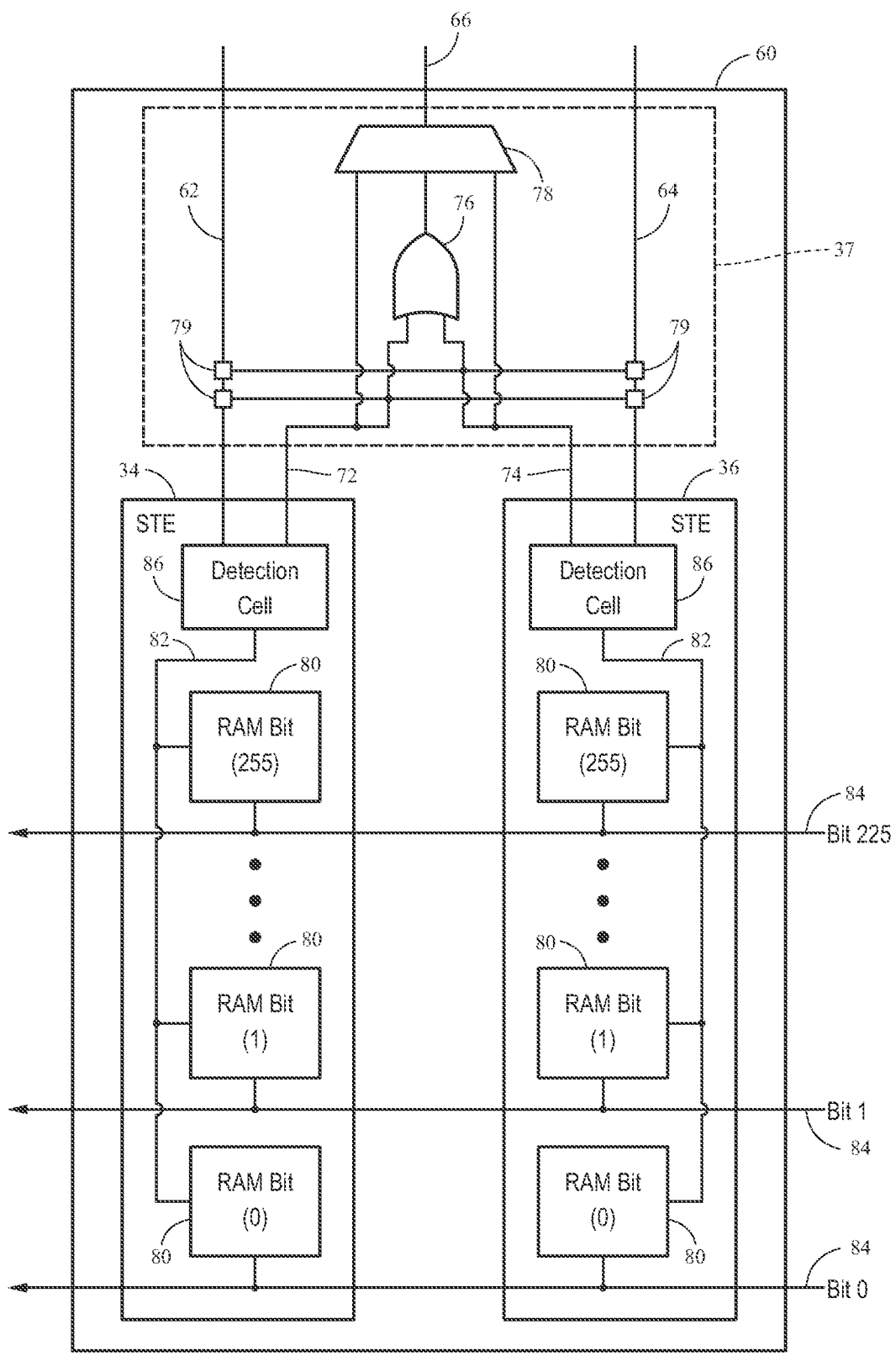
FIG. 5 illustrates an example of a Group of Two of the row of FIG. 4, according to embodiments.

FIG. 5 illustrates an example of a GOT 60. The GOT 60 includes a first STE 34 and a second STE 36 coupled to intra-group circuitry 37. For example, the first STE 34 and a second STE 36 may have inputs 62, 64 and outputs 72, 74 coupled to an OR gate 76 and a 3-to-1 multiplexer 78 of the intra-group circuitry 37. The 3-to-1 multiplexer 78 can be set to couple the output 66 of the GOT 60 to either the first STE 34, the second STE 36, or the OR gate 76. The OR gate 76 can be used to couple together both outputs 72, 74 to form the common output 66 of the GOT 60. In an example, the first and second STE 34, 36 exhibit parity, as discussed above, where the input 62 of the first STE 34 can be coupled to some of the row interconnection conductors 68 and the input 64 of the second STE 36 can be coupled to other row interconnection conductors 70 the common output 66 may be produced which may overcome parity problems. In an example, the two STEs 34, 36 within a GOT 60 can be cascaded and/or looped back to themselves by setting either or both of switching elements 79. The STEs 34, 36 can be cascaded by coupling the output 72, 74 of the STEs 34, 36 to the input 62, 64 of the other STE 34, 36. The STEs 34, 36 can be looped back to themselves by coupling the output 72, 74 to their own input 62, 64. Accordingly, the output 72 of the first STE 34 can be coupled to neither, one, or both of the input 62 of the first STE 34 and the input 64 of the second STE 36. Additionally, as each of the inputs 62, 64 may be coupled to a plurality of row routing lines, an OR gate may be utilized to select any of the inputs from these row routing lines along inputs 62, 64, as well as the outputs 72, 74.

In an example, each STE 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective STE 34, 36. When in the active state, the detection cell 86 outputs a low signal on the respective output line 72, 74 when the signals from all of the memory cells 82 of the respective STE 34, 36 are low.

In an example, an STE 34, 36 includes 256 memory cells 80 and each memory cell 80 is coupled to a different data stream line 84. Thus, an STE 34, 36 can be programmed to output a high signal when a selected one or more of the data stream lines 84 have a high signal thereon. For example, the STE 34 can have a first memory cell 80 (e.g., bit 0) set high and all other memory cells 80 (e.g., bits 1-255) set low. When the respective detection cell 86 is in the active state, the STE 34 outputs a high signal on the output 72 when the data stream line 84 corresponding to bit 0 has a high signal thereon. In other examples, the STE 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the STEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the STEs 34, 36. For example, a first STE 34 can be set to an active state by setting the detection cell 86 to the active state. The first STE 34 can be set to output a high signal when the data stream line 84 corresponding to bit 0 has a high signal thereon. The second STE 36 can be initially set to an inactive state, but can be set to, when active, output a high signal when the data stream line 84 corresponding to bit 1 has a high signal thereon. The first STE 34 and the second STE 36 can be cascaded by setting the output 72 of the first STE 34 to couple to the input 64 of the second STE 36. Thus, when a high signal is sensed on the data stream line 84 corresponding to bit 0, the first STE 34 outputs a high signal on the output 72 and sets the detection cell 86 of the second STE 36 to an active state. When a high signal is sensed on the data stream line 84 corresponding to bit 1, the second STE 36 outputs a high signal on the output 74 to activate another STE 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a search result of a given pattern, a word comprising a plurality of bits indicating search results and non-search results to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
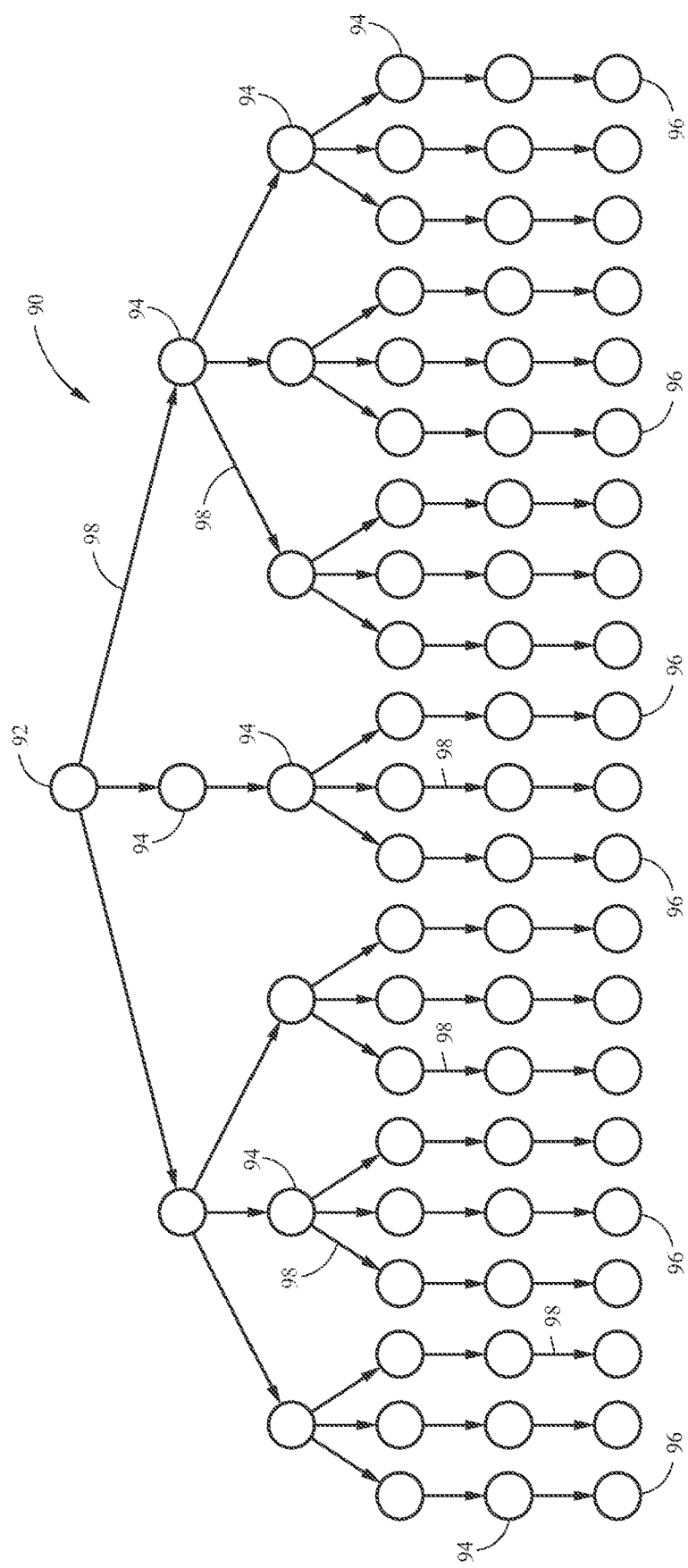
FIG. 6 illustrates an example of a finite state machine graph, according to various embodiments.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a search result of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a search result to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past search results. For example, the one or more patterns of input data required to reach a terminal node 96 can be represented by the activation of that terminal node 96. In an example, the output provided by a terminal node 96 is binary, for example, the output indicates whether a search result for a pattern of interest has been generated or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
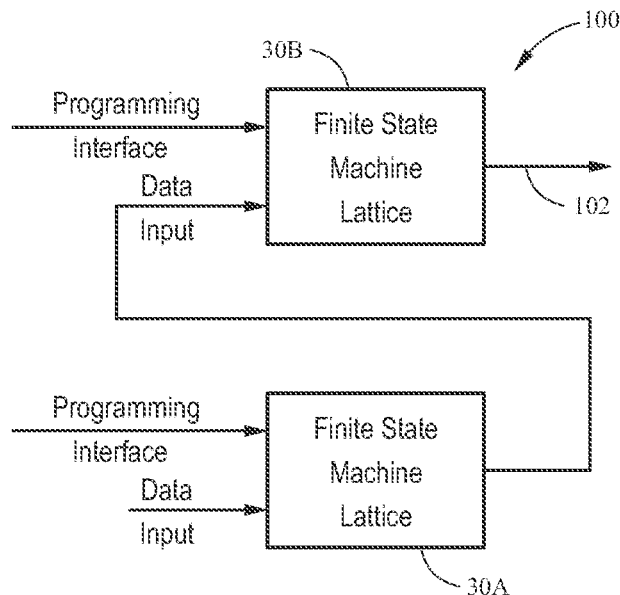
FIG. 7 illustrates an example of two-level hierarchy implemented with FSM lattices, according to various embodiments.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past search results in a compressed word from a first FSM lattice 30A to a second FSM lattice 30B. The data provided can effectively be a summary of complex matches (e.g., sequences of interest) that were recorded by the first FSM lattice 30A.

Figure 7A:
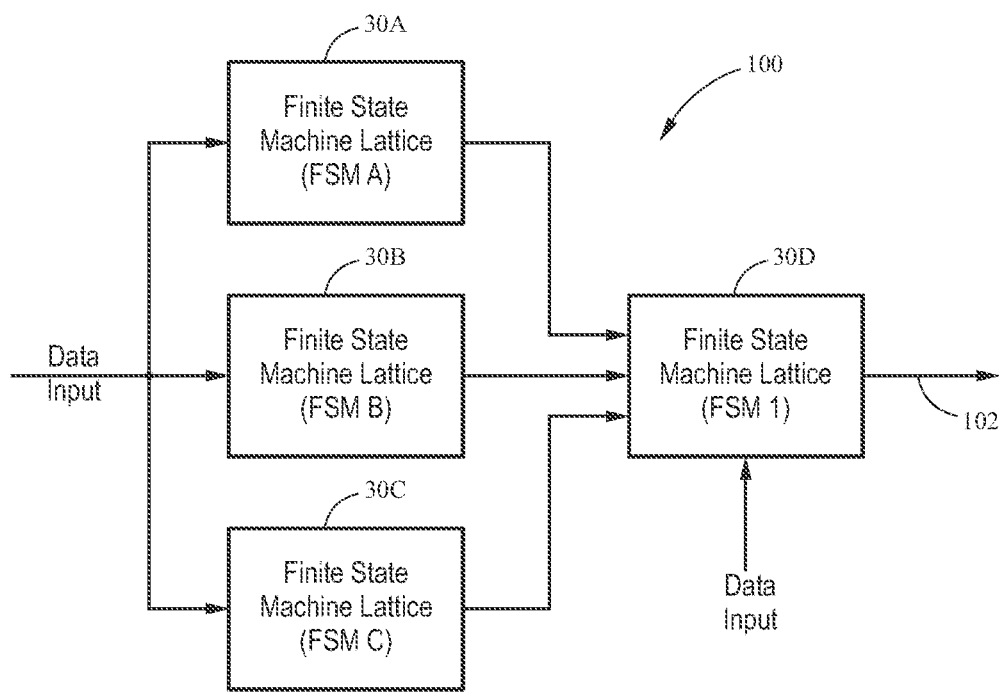
FIG. 7A illustrates a second example of two-level hierarchy implemented with FSM lattices, according to various embodiments.

FIG. 7A illustrates a second two-level hierarchy 100 of FSM lattices 30A, 30B, 30C, and 30D, which allows the overall FSM 100 (inclusive of all or some of FSM lattices 30A, 30B, 30C, and 30D) to perform two independent levels of analysis of the input data. The first level (e.g., FSM lattice 30A, FSM lattice 30B, and/or FSM lattice 30C) analyzes the same data stream, which includes data inputs to the overall FSM 100. The outputs of the first level (e.g., FSM lattice 30A, FSM lattice 30B, and/or FSM lattice 30C) become the inputs to the second level, (e.g., FSM lattice 30D). FSM lattice 30D performs further analysis of the combination the analysis already performed by the first level (e.g., FSM lattice 30A, FSM lattice 30B, and/or FSM lattice 30C). By connecting multiple FSM lattices 30A, 30B, and 30C together, increased knowledge about the data stream input may be obtained by FSM lattice 30D.

The first level of the hierarchy (implemented by one or more of FSM lattice 30A, FSM lattice 30B, and FSM lattice 30C) can, for example, perform processing directly on a raw data stream. For example, a raw data stream can be received at an input block 52 of the first level FSM lattices 30A, 30B, and/or 30C and the configurable elements of the first level FSM lattices 30A, 30B, and/or 30C can react to the raw data stream. The second level (implemented by the FSM lattice 30D) of the hierarchy can process the output from the first level. For example, the second level FSM lattice 30D receives the output from an output block 54 of the first level FSM lattices 30A, 30B, and/or 30C at an input block 52 of the second level FSM lattice 30D and the configurable elements of the second level FSM lattice 30D can react to the output of the first level FSM lattices 30A, 30B, and/or 30C. Accordingly, in this example, the second level FSM lattice 30D does not receive the raw data stream as an input, but rather receives the indications of search results for patterns of interest that are generated from the raw data stream as determined by one or more of the first level FSM lattices 30A, 30B, and/or 30C. Thus, the second level FSM lattice 30D can implement a FSM 100 that recognizes patterns in the output data stream from the one or more of the first level FSM lattices 30A, 30B, and/or 30C. However, it should also be appreciated that the second level FSM lattice 30D can additionally receive the raw data stream as an input, for example, in conjunction with the indications of search results for patterns of interest that are generated from the raw data stream as determined by one or more of the first level FSM lattices 30A, 30B, and/or 30C. It should be appreciated that the second level FSM lattice 30D may receive inputs from multiple other FSM lattices in addition to receiving output from the one or more of the first level FSM lattices 30A, 30B, and/or 30C. Likewise, the second level FSM lattice 30D may receive inputs from other devices. The second level FSM lattice 30D may combine these multiple inputs to produce outputs. Finally, while only two levels of FSM lattices 30A, 30B, 30C, and 30D are illustrated, it is envisioned that additional levels of FSM lattices may be stacked such that there are, for example, three, four, 10, 100, or more levels of FSM lattices.

Figure 8:
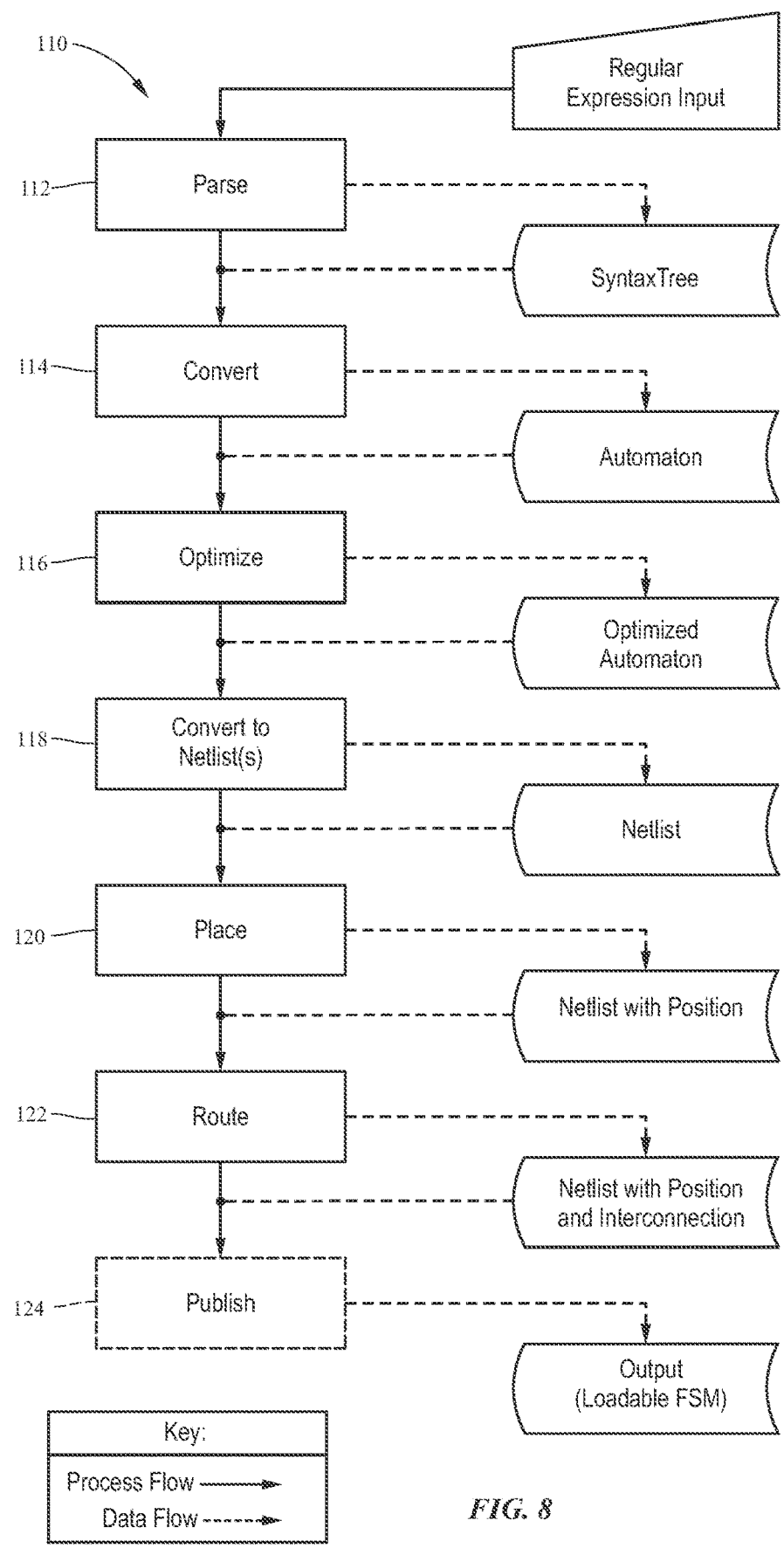
FIG. 8 illustrates an example of a method for a compiler to convert source code into a binary file for programming of the FSM lattice of FIG. 2, according to various embodiments.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexes in the source code in the form of a tree graph known as a syntax tree. The examples described herein refer to the arrangement as a syntax tree (also known as an "abstract syntax tree") in other examples, however, a concrete syntax tree as part of the abstract syntax tree, a concrete syntax tree in place of the abstract syntax tree, or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. For example, different operators can correspond to different functions implemented by the regexes in the source code.

At block 114, the syntax tree is converted into an automaton. An automaton comprises a software model of a FSM which may, for example, comprise a plurality of states. In order to convert the syntax tree into an automaton, the operators and relationships between the operators in the syntax tree are converted into states with transitions between the states. Moreover, in one embodiment, conversion of the automaton is accomplished based on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol a, i.e. δ(p, α), is shown by a directed connection from node p to node q. In an example, a reversal of an automaton produces a new automaton where each transition p→q on some symbol α is reversed q→p on the same symbol. In a reversal, start states become final states and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., STEs 34, 36, other elements) on the FSM lattice 30, and determines the connections between the hardware elements.

At block 120, the netlist is placed to select a specific hardware element of the target device (e.g., STEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements than can be accounted for via the placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of STEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the STEs 34, 36 and other hardware elements or by loading the image into one or more registers and then writing the bit values from the registers to the STEs 34, 36 and other hardware elements. In an example, the hardware elements (e.g., STEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
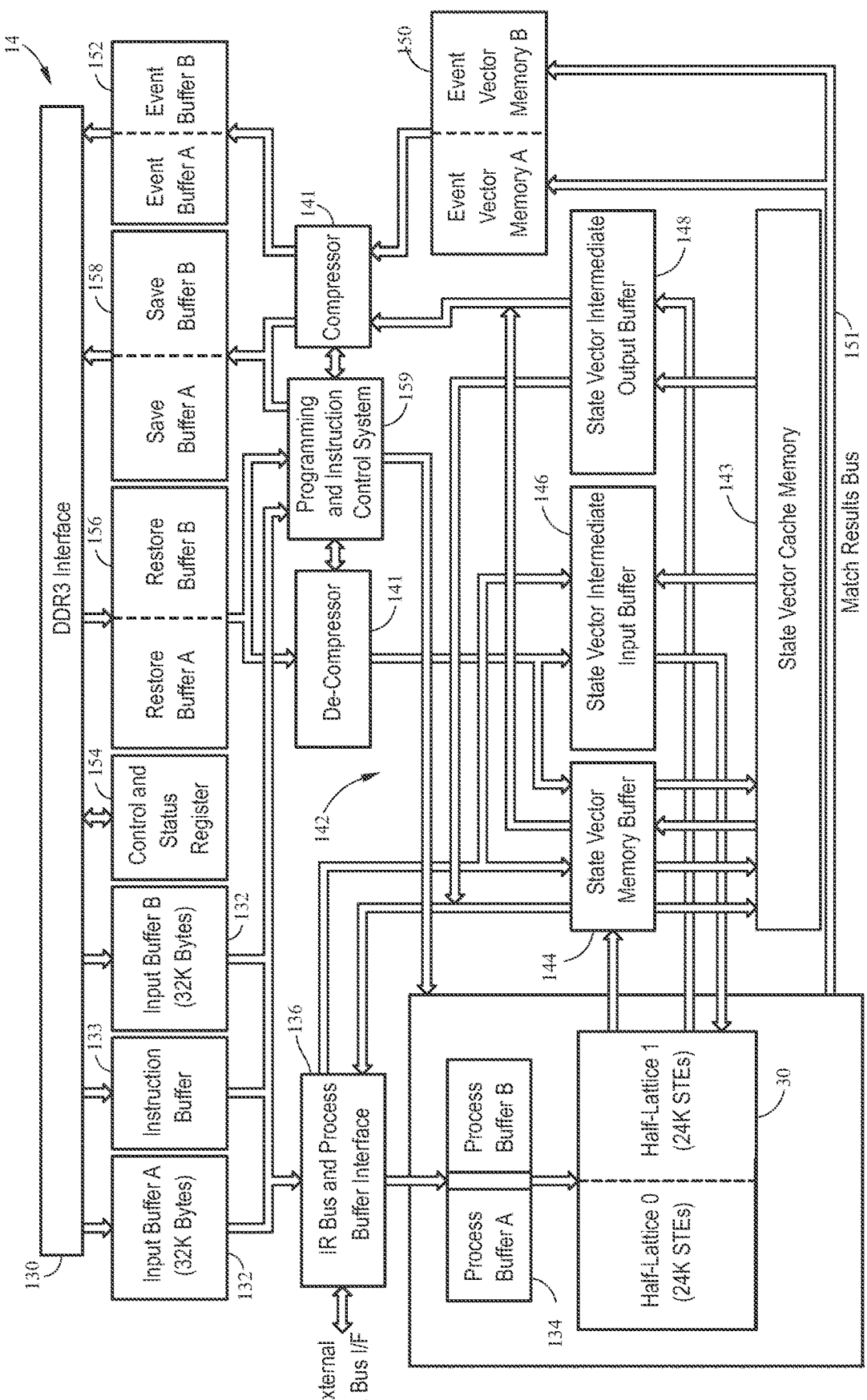
FIG. 9 illustrates a state machine engine, according to various embodiments.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K STEs (e.g., STEs 34, 36), such that the lattice 30 includes 48K STEs. The lattice 30 may comprise any desirable number of STEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes input buffers 132, an instruction buffer 133, process buffers 134, and an inter-rank (IR) bus and process buffer interface 136. The input buffers 132 are configured to receive and temporarily store data to be analyzed. In one embodiment, there are two input buffers 132 (input buffer A and input buffer B). Data may be stored in one of the two data input 132, while data is being emptied from the other input buffer 132, for analysis by the FSM lattice 30. The bus interface 130 may be configured to provide data to be analyzed to the input buffers 132 until the input buffers 132 are full. After the input buffers 132 are full, the bus interface 130 may be configured to be free to be used for other purpose (e.g., to provide other data from a data stream until the input buffers 132 are available to receive additional data to be analyzed). In the illustrated embodiment, the input buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the analyzing of multiple data sets in parallel through a logical rank of FSM lattices 30. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include a 32 bit data bus. In other embodiments, the IR bus and process buffer interface 136 may include any suitable data bus, such as a 128 bit data bus.

In the illustrated embodiment, the state machine engine 14 also includes a de-compressor 138 and a compressor 140 to aid in providing state vector data through the state machine engine 14. The compressor 140 and de-compressor 138 work in conjunction such that the state vector data can be compressed to minimize the data providing times. By compressing the state vector data, the bus utilization time may be minimized. The compressor 140 and de-compressor 138 can also be configured to handle state vector data of varying burst lengths. By padding compressed state vector data and including an indicator as to when each compressed region ends, the compressor 140 may improve the overall processing speed through the state machine engine 14. The compressor 140 may be used to compress results data after analysis by the FSM lattice 30. The compressor 140 and de-compressor 138 may also be used to compress and decompress configuration data. In one embodiment, the compressor 140 and de-compressor 138 may be disabled (e.g., turned off) such that data flowing to and/or from the compressor 140 and de-compressor 138 is not modified.

As previously described, an output of the FSM lattice 30 can comprise a state vector. The state vector comprises the state (e.g., activated or not activated) of the STEs 34, 36 of the FSM lattice 30 and the dynamic (e.g., current) count of the counter 58. The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30 and to provide a state vector to the FSM lattice 30 to restore the FSM lattice 30 to a state corresponding to the provided state vector. For example, each state vector may be temporarily stored in the state vector cache memory 142. For example, the state of each STE 34, 36 may be stored, such that the state may be restored and used in further analysis at a later time, while freeing the STEs 34, 36 for further analysis of a new data set (e.g., search terms). Like a typical cache, the state vector cache memory 142 allows storage of state vectors for quick retrieval and use, here by the FSM lattice 30, for instance. In the illustrated embodiment, the state vector cache memory 142 may store up to 512 state vectors.

As will be appreciated, the state vector data may be exchanged between different state machine engines 14 (e.g., chips) in a rank. The state vector data may be exchanged between the different state machine engines 14 for various purposes such as: to synchronize the state of the STEs 34, 36 of the FSM lattices 30 of the state machine engines 14, to perform the same functions across multiple state machine engines 14, to reproduce results across multiple state machine engines 14, to cascade results across multiple state machine engines 14, to store a history of states of the STEs 34, 36 used to analyze data that is cascaded through multiple state machine engines 14, and so forth. Furthermore, it should be noted that within a state machine engine 14, the state vector data may be used to quickly configure the STEs 34, 36 of the FSM lattice 30. For example, the state vector data may be used to restore the state of the STEs 34, 36 to an initialized state (e.g., to prepare for a new input data set), or to restore the state of the STEs 34, 36 to prior state (e.g., to continue searching of an interrupted or "split" input data set). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency of the STEs 34, 36, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for configuring the FSM lattice 30. Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144.

Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, an event vector may be stored in an event vector memory 150, whereby, for example, the event vector indicates at least one search result (e.g., detection of a pattern of interest). The event vector can then be sent to an event buffer 152 for transmission over the bus interface 130 to the processor 12, for example. As previously described, the results may be compressed. The event vector memory 150 may include two memory elements, memory element A and memory element B, each of which contains the results obtained by processing the input data in the corresponding input buffers 132 (e.g., input buffer A and input buffer B). In one embodiment, each of the memory elements may be DRAM memory elements or any other suitable storage devices. In some embodiments, the memory elements may operate as initial buffers to buffer the event vectors received from the FSM lattice 30, along results bus 151. For example, memory element A may receive event vectors, generated by processing the input data from input buffer A, along results bus 151 from the FSM lattice 30. Similarly, memory element B may receive event vectors, generated by processing the input data from input buffer B, along results bus 151 from the FSM lattice 30.

In one embodiment, the event vectors provided to the event vector memory 150 may indicate that a final result has been found by the FSM lattice 30. For example, the event vectors may indicate that an entire pattern has been detected. Alternatively, the event vectors provided to the event vector memory 150 may indicate, for example, that a particular state of the FSM lattice 30 has been reached. For example, the event vectors provided to the event vector memory 150 may indicate that one state (i.e., one portion of a pattern search) has been reached, so that a next state may be initiated. In this way, the event vector memory 150 may store a variety of types of results.

In some embodiments, IR bus and process buffer interface 136 may provide data to multiple FSM lattices 30 for analysis. This data may be time multiplexed. For example, if there are eight FSM lattices 30, data for each of the eight FSM lattices 30 may be provided to all of eight IR bus and process buffer interfaces 136 that correspond to the eight FSM lattices 30. Each of the eight IR bus and process buffer interfaces 136 may receive an entire data set to be analyzed. Each of the eight IR bus and process buffer interfaces 136 may then select portions of the entire data set relevant to the FSM lattice 30 associated with the respective IR bus and process buffer interface 136. This relevant data for each of the eight FSM lattices 30 may then be provided from the respective IR bus and process buffer interfaces 136 to the respective FSM lattice 30 associated therewith.

The event vector memory 150 may operate to correlate each received result with a data input that generated the result. To accomplish this, a respective result indicator may be stored corresponding to, and in some embodiments, in conjunction with, each event vector received from the results bus 151. In one embodiment, the result indicators may be a single bit flag. In another embodiment, the result indicators may be a multiple bit flag. If the result indicators may include a multiple bit flag, the bit positions of the flag may indicate, for example, a count of the position of the input data stream that corresponds to the event vector, the lattice that the event vectors correspond to, a position in set of event vectors, or other identifying information. These results indicators may include one or more bits that identify each particular event vector and allow for proper grouping and transmission of event vectors, for example, to compressor 140. Moreover, the ability to identify particular event vectors by their respective results indicators may allow for selective output of desired event vectors from the event vector memory 150. For example, only particular event vectors generated by the FSM lattice 30 may be selectively latched as an output. These result indicators may allow for proper grouping and provision of results, for example, to compressor 140. Moreover, the ability to identify particular event vectors by their respective result indicators allow for selective output of desired event vectors from the event vector memory 150. Thus, only particular event vectors provided by the FSM lattice 30 may be selectively provided to compressor 140.

Additional registers and buffers may be provided in the state machine engine 14, as well. In one embodiment, for example, a buffer may store information related to more than one process whereas a register may store information related to a single process. For instance, the state machine engine 14 may include control and status registers 154. In addition, a program buffer system (e.g., restore buffers 156) may be provided for initializing the FSM lattice 30. For example, initial (e.g., starting) state vector data may be provided from the program buffer system to the FSM lattice 30 (e.g., via the de-compressor 138). The de-compressor 138 may be used to decompress configuration data (e.g., state vector data, routing switch data, STE 34, 36 states, Boolean function data, counter data, match MUX data) provided to program the FSM lattice 30.

Similarly, a repair map buffer system (e.g., save buffers 158) may also be provided for storage of data (e.g., save maps) for setup and usage. The data stored by the repair map buffer system may include data that corresponds to repaired hardware elements, such as data identifying which STEs 34, 36 were repaired. The repair map buffer system may receive data via any suitable manner. For example, data may be provided from a "fuse map" memory, which provides the mapping of repairs done on a device during final manufacturing testing, to the save buffers 158. As another example, the repair map buffer system may include data used to modify (e.g., customize) a standard programming file so that the standard programming file may operate in a FSM lattice 30 with a repaired architecture (e.g., bad STEs 34, 36 in a FSM lattice 30 may be bypassed so they are not used). The compressor 140 may be used to compress data provided to the save buffers 158 from the fuse map memory. As illustrated, the bus interface 130 may be used to provide data to the restore buffers 156 and to provide data from the save buffers 158. As will be appreciated, the data provided to the restore buffers 156 and/or provided from the save buffers 158 may be compressed. In some embodiments, data is provided to the bus interface 130 and/or received from the bus interface 130 via a device external to the state machine engine 14 (e.g., the processor 12, the memory 16, the compiler 20, and so forth). The device external to the state machine engine 14 may be configured to receive data provided from the save buffers 158, to store the data, to analyze the data, to modify the data, and/or to provide new or modified data to the restore buffers 156.

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

The state machine engine 14 includes a lattice programming and instruction control system 159 used to configure (e.g., program) the FSM lattice 30 as well as provide inserted instructions, as will be described in greater detail below. As illustrated, the lattice programming and instruction control system 159 may receive data (e.g., configuration instructions) from the instruction buffer 133. Furthermore, the lattice programming and instruction control system 159 may receive data (e.g., configuration data) from the restore buffers 156. The lattice programming and instruction control system 159 may use the configuration instructions and the configuration data to configure the FSM lattice 30 (e.g., to configure routing switches, STEs 34, 36, Boolean cells, counters, match MUX) and may use the inserted instructions to correct errors during the operation of the state machine engine 14. The lattice programming and instruction control system 159 may also use the de-compressor 138 to de-compress data and the compressor 140 to compress data (e.g., for data exchanged with the restore buffers 156 and the save buffers 158).

In some embodiments, the state machine engine 14 may be utilized to solve particular classes of problems. One such class of problems includes traversal of a graph. For example, the state machine engine 14 may be utilized, such that an arbitrary directed or non-directed graph can be represented within the state machine engine 14. A host (e.g., processor 12 or a separate device), in conjunction with the state machine engine 14, can then perform a series of query/response operations that cause the graph to be traversed. In this manner, the state machine engine 14 may be utilized to provide analysis of the graph and supply results thereof to the host (e.g., processor 12) to allow the host (e.g., processor 12) to discover and/or to be informed of, for example, the shortest path from any arbitrary node in the graph to any other node in the graph (if a path exists).

The state machine engine 14 is a pattern matching engine that may be an automata processor. Automatons (e.g., taken together to be an automata network that may be implemented as part of the state machine engine 14 and, more particularly, the FSM lattice 30) that are believed to be particularly useful in solving graphs are now presented. Graphs can be used to model types of relations and processes in physical, biological, social, and information systems such that many practical problems can be represented by graphs. A graph may be a representation of a set of objects in which a node (vertex) is a fundamental unit of which the graph is formed. The graph may also include one or more edges, whereby each edge has two (or in hypergraphs, more) nodes to which it is attached, called its endpoints. The edges may be directed or undirected. In an undirected graph, an edge may be represented as the set of its nodes, and in a directed graph it may be represented as an ordered pair of its nodes. An edge that connects nodes "x" and "y" is sometimes written "xy." The graph may be an undirected graph in which edges have no orientation (e.g., an edge [x, y] is identical the edge [y, x]) or a directed graph in which the edges have orientations and is written as an ordered pair where the graph=(V, A), with "V" being a set of nodes and "A" being a set of ordered pairs of nodes called arrows, directed edges, directed arcs, or directed lines. A graph may be illustrated whereby a node is represented by a circle with a label, and an edge is represented by a line or arrow extending from one node to another.

As noted above, automatons (e.g., automata networks that may be implemented as part of the state machine engine 14 and, more particularly, the FSM lattice 30) can be used in solving graphs, for example, the state machine engine 14 can be utilized to represent graph edges as patterns within the state machine engine 14. Each graph edge representation is embodied within an automaton (e.g., one or more particular STEs 34, 36) specific to that edge. The host (e.g., processor 12) delivers a list of nodes as a query string to the programmed state machine engine 14 for analysis. Each automaton within the state machine engine 14 evaluates whether or not it contains an edge that originates on one of the nodes in the query string. If an automaton does match this condition, that automaton will report the destination node of the edge it represents. Thus, the host (e.g., processor 12) can start at any arbitrary node (the origin), and it can determine via the state machine engine 14 what nodes can be reached from the origin node. A list of nodes that can be reached from the set of query nodes (e.g., an origin node and/or additionally provided nodes) is returned by the state machine engine 14 to the host (e.g., processor 12). The host (e.g., processor 12) can utilize the set of one-hop reachable nodes and deliver that set of nodes as a new query to the state machine engine 14 for analysis. The state machine engine 14 can respond by reporting the set of nodes reachable from the one-hop reachable nodes as representative of the two-hop reachable nodes. This process may be continued iteratively, with the host (e.g., processor 12) discovering new nodes reachable at increasingly greater distances from the origin node. Eventually the host (e.g., processor 12) will find within the result set the target destination node (at which point processing stops) or the state machine engine 14 returns an empty result set (indicating the target node is not reachable from the origin node). If the target node is discovered during this iterative process, the host (e.g., processor 12) has determined (1) the target node is reachable from the origin node and (2) the distance from the origin node to the target node. Additionally, logging, tracking, and/or similar techniques via the host (e.g., processor 12) and/or the state machine engine 14 may be utilized to discover that path from the origin node to the target node.

In some embodiments, the state machine engine 14 may be configured (e.g., programmed) via the compiler 20 for each edge and each node of a particular graph to be solved. For example, one or more STEs 34, 36 may be programmed to each represent a node to be evaluated while an edge may be programmed as a hardware connection (e.g., one or more inter block switching elements 40, intra-block switching elements 42, intra-row switching elements 44, and/or an intra-group circuitry 37 coupled to the respective STE 34, 36). However, direct implementation of an entirety of a graph in this manner (e.g., through direct assignment of respective STEs 34, 36, and their respective hardware connections to reproduce or mimic the graph to be solved) may exceed the size of the state machine engine 14 and/or lead to routing problems related to the hardware connections (e.g., the interconnection of one or more inter block switching elements 40, intra-block switching elements 42, intra-row switching elements 44, and/or an intra-group circuitry 37 coupled to the respective STEs 34, 36). Accordingly, alternate techniques for utilization of the state machine engine 14 to solve a particular graph may be undertaken.

Figure 10:
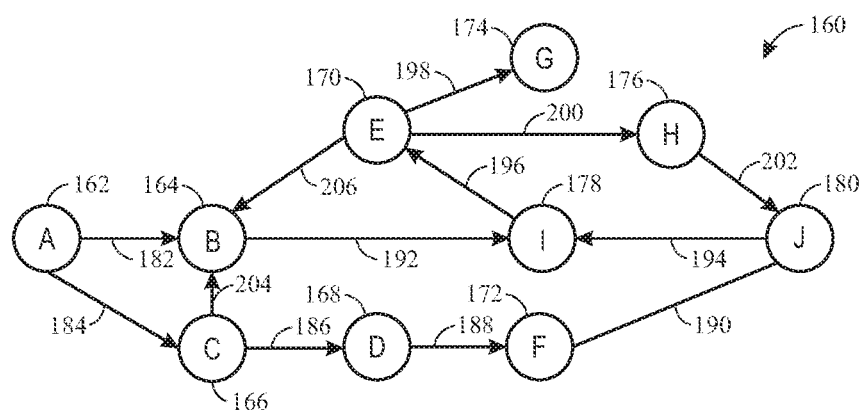
FIG. 10 illustrates representation of an example of a graph.

FIG. 10 illustrates a representation of a graph 160 to be solved to determine one or more of a shortest path between two nodes (e.g., a shortest path problem), a longest path between two nodes, a travelling salesman problem, travel through the graph between two points with no node repetition, ability to traverse the graph between two points, and the like. As illustrated, the graph 160 includes nodes 162, 164, 166, 168, 170, 171, 174, 176, 178, and 180. Additionally, the graph 160 includes edges 182, 184, 186, 188, 190, 192, 194, 196, 198, 200, 202, 204, and 206. One problem to be solved for graph 160 may be, for example, can traversal between node 166 "C" and node 174 "G" be accomplished? A second problem (as a subset of the first problem to be solved) may be described as finding the shortest path between node 166 "C" and node 174 "G" that is available. The graph 160 may be represented as an edge list, as set forth below:

A→B
A→C
B→I
C→B
C→D
D→F
E→B
E→G
E→H
F→J
H→J
I→E
J→I

This edge list may represent a graph as just a list, or array, of edges. To represent an edge, the two nodes that correspond to the nodes that the edges are incident on are set forth as objects. In the present example, no weight factors are present, however, in situations where the edges have weights, a third element may be added to the array or more information may be added to the objects, giving weight to the edge.

Figure 11:
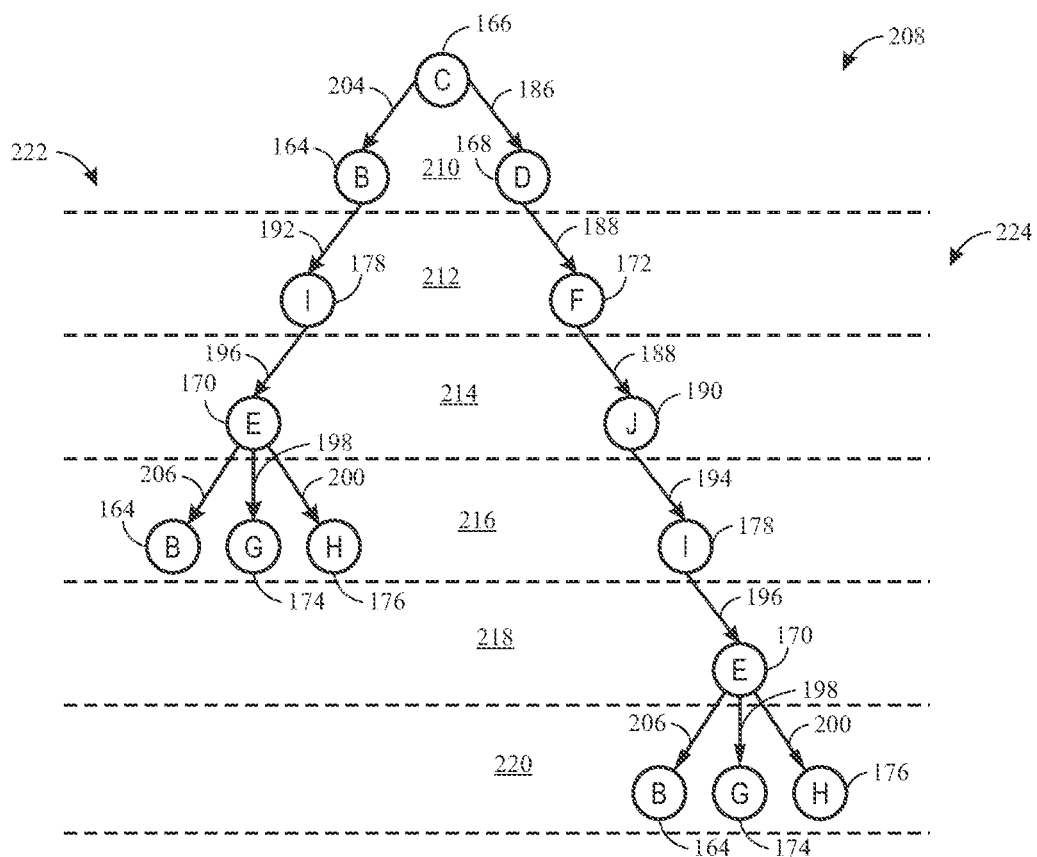
FIG. 11 illustrates solutions to a problem to be solved for the graph of FIG. 10.

The use of an edge list, or a modified version thereof, may be helpful in representing potential solutions for the traversal of the graph 160. For example, there are two solutions for traversal of the graph 160 between node 166 "C" and node 174 "G." These solutions are illustrated in FIG. 11 as a solution diagram 208. As illustrated, the solution diagram 208 includes a first level 210, a second level 212, a third level 214, a fourth level 216 a fifth level 218, and a sixth second level 220. Each of the levels 210, 212, 214, 216, 218, and 220 (or hops) may represent all transitions from a node (e.g., node 166) to all associated nodes (e.g., node 164 or node 168) coupled thereto along respective edges (e.g., edge 204 or edge 186). In this manner, each of the levels 210, 212, 214, 216, 218, and 220 may represent an event. That is, one or more STEs 34, 36 of the one or more FSM lattices 30 of the state machine engine 14 may be programmed to correspond to a node that can be reached from a given node based on the analysis of an input character. This analysis generates a report (e.g., outputs a signal indicating whether the input character was matched in the respective node), that is, when the stored value (e.g., character) of a node matches the input data, an event is generated to be reported. In this manner, all nodes in the graph can be evaluated and a solution of whether the graph problem can be solved and, if so, how many levels (hops) required to solve the graph can be determined.

As illustrated in FIG. 11, the solution diagram 208 includes a first solution path 222 and a second solution path 224. Node 166 "C" has two edges, 204 and 186 that connect node 166 "C" to each of node 164 "B" and node 168 "D," respectively, as the first level 210 (e.g., a first hop from original node 166 "C"). Repeating the traversal process from the nodes 164 "B" and 168 "D" of the first level 210, node 164 "B" has a single edge 192 to node 178 "I," while node 168 "D" has a single edge 188 to node 172 "F." This portion of the traversal process represents the second level 212 (e.g., a second hop from original node 166 "C"). Continuing the traversal of the graph 160 from the second level 212, the node 178 "I" has a single edge 196 to node 170 "E," while node 172 "F" has a single edge 188 to node 190 "J." This portion of the traversal process represents the third level 214 (e.g., a third hop from original node 166 "C").

From the third level 214, there exists three edges 206, 198, and 200 to node 164 "B," node 174 "G," and node 176 "H," respectively. Likewise, there exits one edge 194 from node 190 "J" to node 178 "I." In combination, these represent the fourth level 216 (e.g., a fourth hop from original node 166 "C"). With respect to the first solution path 222, traversal of the graph 160 from original node 166 "C" to node 174 "G" is complete at the fourth level 216. Accordingly, a solution (e.g., the first solution path 222) for the problem of graph traversal from node 166 "C" to node 174 "G" has been found and it includes a fourth level 216 of traversals (e.g., four hops) to traverse the graph 160 from node 166 "C" to node 174 "G." In some embodiments, the process may be halted, as the optimum (shortest path solution) has been found as the first solution path 222. However, in other embodiments, additional traversal of the graph 160 may be continued along the second solution path 224 to identify any additional solutions of the problem being analyzed.

From the fourth level 216, one edge 196 from node 178 "I" to node 170 "E." This portion of the traversal process represents the fifth level 218 (e.g., a fifth hop from original node 166 "C"). From the fifth level 218, there exists three edges 206, 198, and 200 to node 164 "B," node 174 "G," and node 176 "H," respectively, as the sixth level 220 (e.g., a sixth hop from original node 166 "C"). With respect to the second solution path 224, traversal of the graph 160 from original node 166 "C" to node 174 "G" is complete at the sixth level 216. Accordingly, a second solution (e.g., the second solution path 224) for the problem of graph traversal from node 166 "C" to node 174 "G" has been found and it includes a sixth level 220 of traversals (e.g., six hops) to traverse the graph 160 from node 166 "C" to node 174 "G." As no other solutions to traversal of the graph 160 (without crossing the same edge 182, 184, 186, 188, 190, 192, 194, 196, 198, 200, 202, 204, and 206 twice) exist, the analysis the example problem for traversal of the graph 160 is complete. Two solutions (e.g., the first solution path 222 and the second solution path 224) have been discovered and their respective levels (e.g., the fourth level 216 and the sixth level 220) may be associated with the respective solutions. Likewise, as previously discussed, once a single solution (e.g., the first solution path 222) has been discovered (as well as its level, e.g., the fourth level 216), the analysis of the graph 160 may be complete, for example, if only the optimal (e.g., shortest path) solution is desired. Examples of the use of the state machine engine 14 to perform the analysis describes above (or similar graph problem solving) will be discussed in detail below.

As previously noted, the state machine engine 14 may be configured (e.g., programmed) via the compiler 20 for each edge (e.g., edges 182, 184, 186, 188, 190, 192, 194, 196, 198, 200, 202, 204, and 206) and each node (e.g., nodes 162, 164, 166, 168, 170, 171, 174, 176, 178, and 180) of a particular graph (e.g., graph 160) to be solved. For example, for example a given graph problem to be solved may be reduced to an edge list with pairs of nodes. The input data to the state machine engine 14 (e.g., provided to one or more FSM lattices 30 via respective input blocks 52) may be provided such that given a particular node, a report (e.g., output a signal indicating whether one or more conditions of are detected) can be generated when any the variable of that node matches the input data. Additionally, a node may be programmed (e.g., represented) in the state machine engine 14 as individual STEs 34, 36, whereby each programmed STE 34, 36 corresponds to a particular edge of the node.

Examples of automatons (e.g., as part of an automata network that may be implemented as part of the state machine engine 14 and, more particularly, the FSM lattice 30) that are believed to be particularly useful in solving graph problems are now presented. For example, the automaton (e.g., one or more particular STEs 34, 36) corresponding to a portion of a graph may recognize an input character and transmit a report of a match of that character via the automaton.

Figure 12:
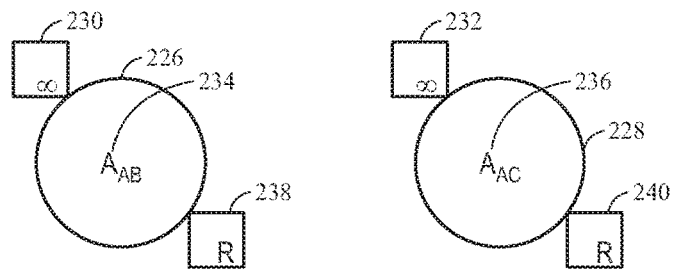
FIG. 12 illustrates a first embodiment of a graphical automaton representation for reporting of one or more events generated in the automaton.

A corresponding example of two such automatons (e.g., respective STEs 34, 36) that may be used to analyze data with respect to a first node 162 "A" of graph 160 are illustrated in FIG. 12. STE symbol 226 and STE symbol 228 of FIG. 12 may each represent a single STE (e.g., one of a respective STE 34, 36) to analyze an input data stream and report any results (e.g., when the input data of the input data stream matches the setting of the respective STE 34, 36, thus generating an event to be reported). STE symbols 226 and 228 may be generated in conjunction with, for example, the Micron Automata Processor Workbench tool. As illustrated, STE symbol 226 may include a start indicator 230 (e.g., "∞" as an all-input attribute) that indicates that the STE represented by STE symbol 226 is active on all input symbol cycles. Similarly, STE symbol 228 also includes a start indicator 232 (e.g., "∞" as an all-input attribute). STE symbol 226 includes a symbol set 234 of "AAB" and STE symbol 228 includes a symbol set 236 of "AAc", whereby the symbol sets 234 and 236 are a programmed symbol set of the STE represented by STE symbols 226 and 228 to be compared against a current input symbol (e.g., the input data) of the input data stream. An active STE 34, 36 will respond to the current input symbol and if the input symbol matches the programmed symbol set of the STE 34, 36, the STE 34, 36 will generate an output (e.g., an activate-on-match that activates any STEs 34, 36 to which it is connected, possibly including itself or a report-on-match to generate a report of the event).

Accordingly, the STE represented by STE symbol 226 is activated by any input data symbol (based on start indicator 230 being an all-input attribute). If the input data symbol (e.g., current input symbol) to the STE represented by STE symbol 226 is the character "A," the input data symbol operates as a match to the symbol set 234 of the STE represented by STE symbol 226 as an event, at which time the STE represented by STE symbol 226 (which has a "AAB" as a symbol set 234), will generate a report (indicated by report indicator 238) that an event was generated in conjunction with the respective portion of the input data stream being analyzed by the STE represented by STE symbol 226. This report that is generated corresponds to edge 182, since the "AAB" as a symbol set 234 corresponds to the edge 182 between node 162 "A" and node 164 "B."

Likewise, the STE represented by STE symbol 228 is activated by any input data symbol (based on start indicator 232 being an all-input attribute). If the input data symbol (e.g., current input symbol) to the STE represented by STE symbol 228 is the character "A," the input data symbol operates as a match to the symbol set 236 of the STE represented by STE symbol 228 as an event, at which time the STE represented by STE symbol 228 (which has a "AAc" as a symbol set 236), will generate a report (indicated by report indicator 240) that an event was generated in conjunction with the respective portion of the input data stream being analyzed by the STE represented by STE symbol 228. This report that is generated corresponds to edge 184, since the "AAc" as a symbol set 236 corresponds to the edge 184 between node 162 "A" and node 166 "C."

Each of the reports generated may be transmitted to the host (e.g., processor 12), which may identify the respective result as corresponding to the respective edge and node being reported. For example, upon receipt of a result from the STE symbol represented by STE symbol 226 as an event, the host (e.g., processor 12) may associate the received result with graph 160 traversal from node 162 "A" to node 164 "B." Similarly, upon receipt of a result from the STE represented by STE symbol 228 as an event, the host (e.g., processor 12) may associate the received result with graph 160 traversal from node 162 "A" to node 166 "C." Thus, host (e.g., processor 12) may transmit a data input data symbol (e.g., a character) to be analyzed by one or more automata networks, which may be implemented as part of the state machine engine 14 and, more particularly, the FSM lattice 30 via programmed automatons (e.g., one or more particular STEs 34, 36). The input data can be analyzed by the automatons and if the input data matches the respective symbol set of an STE 34, 36, that STE 34, 36 can transmit a result as an indication of an event to the host (e.g., processor 12).

Each received result from the automatons of the automata network (e.g., the state machine engine 14) can be categorized as corresponding to a particular edge having a particular level. These categorizations can be tracked and/or stored (e.g., stored in memory 16). Categorizations of the results by the host (e.g., processor 12) can also be used to initiate subsequent transmissions of one or more input data symbols to be analyzed, whereby the input data symbols transmitted correspond to the categorized received results. For example, upon receipt of results from the STEs represented by STE symbols 226 and 228, the host (e.g., processor 12) may identify the respective received results as reporting of the characters "B" and "C," which become the next characters to be input as a data stream to the state machine engine 14 for analysis. It may be appreciated that when more than one character is to be sent to the state machine engine 14 for analysis, the respective characters may be sent together as batched input data. Likewise, when more than one result is to be sent from the state machine engine 14, the results may be sent together as batched results.

An example graphical representation of the above noted process undertaken by the host (e.g., processor 12) to utilize the state machine engine 14 to solve a graph problem, for example, graph traversal of graph 160 between node 166 "C" and node 174 "G" discussed above with respect to FIGS. 10 and 11, is set forth below in Table 1:

TABLE 1

| Host Transmits | Automata Network Report Categorization | Level Classification |
|---|---|---|
| "C" | "B" and "D" | Level 1 |
| "B" and "D" | "I" and "F" | Level 2 |
| "I" and "F" | "E" and "J" | Level 3 |
| "E" and "J" | ("B" and "G" and "H") and "J" | Level 4 |

Thus, as illustrated in Table 1, the host (e.g., processor 12) operates to effectively transform (e.g., convert) a graph problem to be solved into discrete segments to be analyzed (e.g., processed) by the state machine engine 14. Through iterative solving of the discrete segments (e.g., traversal from one node to another of a node pair connected by a respective edge) and through tracking, categorization, and application of those solutions (e.g., events reported as results), the host (e.g., processor 12) can undertake solving of a problem associated with a graph using the state machine engine 14.

Figure 13:
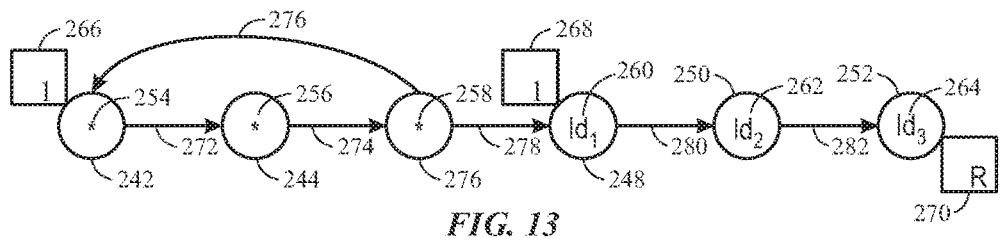
FIG. 13 illustrates a second embodiment of a graphical automaton representation for reporting of one or more events generated in the automaton.

It may be appreciated that a graph problem to be solved may be complex and, thus, involve a large number of node pairs to be analyzed. Accordingly, techniques may be applied to allow for the solving of large and/or complex graph problems. For example, FIG. 13 illustrates an automaton that may include STE symbols 242, 244, 246, 248, 250, and 252 that may each represent an STE (e.g., respective STEs 34, 36). The STE symbols 242, 244, and 246 each include, respectively, a symbol set 254, 256, and 258 of "*" representative of a "don't care" character (e.g., an event will be generated by any input character). The STE symbols 248, 250, and 252 each include, respectively, a symbol set 260, 262, and 264 of "$I_{d1}$," "$I_{d2}$," and "$Id_3$" representative of a multi-character node (e.g., a three character node). Additionally, STE symbols 242 and 248 include a respective start indicator 266 and 268 (e.g., "1" as a start input attribute) that indicates that the STEs represented by STE symbols 242 and 248 are active when a first input cycle (e.g., a first data input) is transmitted from the host (e.g., processor 12) to the state machine engine 14. Finally, the STE represented by STE symbol 252 is able to generate a report (indicated by report indicator 270) that an event was generated in conjunction with the respective portion of the input data stream being analyzed by the STEs represented by STE symbols 248, 250, and 252 (comprising a multi-character node match).

It may be understood that the operation of automaton of FIG. 13 may be representative of the operation and interconnectivity of the underlying respective STEs that correspond to STE symbols 242, 244, 246, 248, 250, and 252. As illustrated, STE symbols 242 and 248 may include start indicators 266 and 268 that indicate that the STEs represented by STE symbols 242 and 248 are active in response to a first data input. STE symbol 242 includes a symbol set 254 of "*," whereby the symbol set 254 is a programmed symbol set of the STE represented by STE symbol 242 to be compared against a current input symbol (e.g., the input data) of the input data stream. An active STE 34, 36 will respond to the current input symbol and if the input symbol matches the programmed symbol set of the STE 34, 36, whereby the STE 34, 36 will generate an output (e.g., an activate-on-match that activates any STEs 34, 36 to which it is connected, possibly including itself or a report-on-match to generate a report of the event).

The STE represented by STE symbol 242 may correspond to a first character of a multi-character node (e.g., a three character node). Accordingly, a first character input as part of the input data transmitted to the STE represented by STE symbol 242 may be compared as the current input symbol against the "*" of symbol set 254 (due to the start indicator 266 that indicates that the STE represented by STE symbol 242 is active in response to a first data input). As any character will match with the "*" of symbol set 254, thus generating an event, the STE represented by STE symbol 242 may activate the respective STE represented by STE symbol 244 as an activate-on-match response. The transition 272 emanating from STE symbol 242 indicates the STE symbol 244 and its underlying STE that will be activated for processing the next character when the source STE (e.g., the STE represented by STE symbol 242) matches the current input symbol (e.g., the first character of the input data stream) with the symbol set (e.g., symbol set 254) of the source STE (e.g., the STE represented by STE symbol 242).

The STE represented by STE symbol 244 may correspond to a second character of a multi-character node (e.g., a three character node). Accordingly, a second character input as part of the input data transmitted to the STE represented by STE symbol 244 may be compared as the current input symbol against the "*" of symbol set 256 (due to activation of the STE represented by the STE symbol 244 being activated along transition 272). As any character will match with the "*" of symbol set 256, thus generating an event, the STE represented by STE symbol 244 may activate the respective STE represented by STE symbol 246 as an activate-on-match response. The transition 274 emanating from STE symbol 244 indicates the STE symbol 246 and its underlying STE that will be activated for processing the next character when the source STE (e.g., the STE represented by STE symbol 244) matches the current input symbol (e.g., the second character of the input data stream) with the symbol set (e.g., symbol set 256) of the source STE (e.g., the STE represented by STE symbol 244).

The STE represented by STE symbol 246 may correspond to a third character of a multi-character node (e.g., a three character node). Accordingly, a third character input as part of the input data transmitted to the STE represented by STE symbol 246 may be compared as the current input symbol against the "*" of symbol set 258 (due to activation of the STE represented by the STE symbol 246 being activated along transition 274). As any character will match with the "*" of symbol set 258, thus generating an event, the STE represented by STE symbol 246 may activate the respective STEs represented by STE symbols 242 and 248 as an activate-on-match response. The transitions 276 and 278 emanating from STE symbol 246 indicate the STE symbols 242 and 248 and their underlying STEs that will be activated for processing the next character when the source STE (e.g., the STE represented by STE symbol 246) matches the current input symbol (e.g., the third character of the input data stream) with the symbol set (e.g., symbol set 258) of the source STE (e.g., the STE represented by STE symbol 246).

Thus, the STE represented by STE symbol 242 will be activated to analyze a fourth character of an input data stream (e.g., a first character of a second multi-character node). Moreover, the process of comparisons and activations of subsequent STEs along transitions 272, 274, and 276 by the STEs represented by STE symbols 242, 244, and 246 can be repeated for the second multi-character node (as well as additional multi-character nodes) in a manner similar to that described above.

Additionally, the STE represented by STE symbol 248 may correspond to a first character of a multi-character node (e.g., a three character node). Accordingly, a first character input as part of the input data transmitted to the STE represented by STE symbol 248 may be compared as the current input symbol against the "$Id_1$" of symbol set 260 (due to the start indicator 268 that indicates that the STE represented by STE symbol 248 is active in response to a first data input). If the first character input does not match the character stored as the "$Id_1$" of symbol set 260, no additional processing of a second character of the multi-character node will occur (e.g., the STE represented by STE symbol 250 will not be activated). However, if the first character input matches the character stored as the "$Id_1$" of symbol set 260, thus generating an event, the STE represented by STE symbol 248 may activate the respective STE represented by STE symbol 250 as an activate-on-match response. The transition 280 emanating from STE symbol 248 indicates the STE symbol 250 and its underlying STE that will be activated for processing the next character when the source STE (e.g., the STE represented by STE symbol 248) matches the current input symbol (e.g., the first character of the input data stream) with the symbol set (e.g., symbol set 260) of the source STE (e.g., the STE represented by STE symbol 248).

The STE represented by STE symbol 250 may correspond to a second character of a multi-character node (e.g., a three character node). Accordingly, a second character input as part of the input data transmitted to the STE represented by STE symbol 250 may be compared as the current input symbol against the "$Id_2$" of symbol set 262 (due to activation of the STE represented by the STE symbol 250 being activated along transition 280). If the second character input does not match the character stored as the "$Id_2$" of symbol set 262, no additional processing of a third character of the multi-character node will occur (e.g., the STE represented by STE symbol 252 will not be activated). However, if the second character input matches the character stored as the "$Id_2$" of symbol set 262, thus generating an event, the STE represented by STE symbol 250 may activate the respective STE represented by STE symbol 252 as an activate-on-match response. The transition 282 emanating from STE symbol 250 indicates the STE symbol 252 and its underlying STE that will be activated for processing the next character when the source STE (e.g., the STE represented by STE symbol 250) matches the current input symbol (e.g., the second character of the input data stream) with the symbol set (e.g., symbol set 262) of the source STE (e.g., the STE represented by STE symbol 250).

The STE represented by STE symbol 252 may correspond to a third character of a multi-character node (e.g., a three character node). Accordingly, a third character input as part of the input data transmitted to the STE represented by STE symbol 252 may be compared as the current input symbol against the "$Id_3$" of symbol set 264 (due to activation of the STE represented by the STE symbol 252 being activated along transition 282). If the third character input does not match the character stored as the "$Id_3$" of symbol set 264, no reporting of an event (e.g., result) will occur. However, if the third character input matches the character stored as the "$Id_3$" of symbol set 264, thus generating an event, the STE represented by STE symbol 252 may generate a report (indicated by report indicator 270) that an event was generated in conjunction with the respective portion of the input data stream being analyzed by the STEs represented by STE symbols 248, 250, and 252 (comprising a multi-character node match).

Thus, if the first three characters of an input data stream generate an event, the reporting of the event can cease processing in the automaton and the event (e.g., result) may be transmitted to the host (e.g., processor 12) for characterization and level classification (in a manner similar to that outlined above in conjunction with Table 1). Moreover, since transition 278 emanating from STE symbol 246 operates to activate a match of when the source STE (e.g., the STE represented by STE symbol 246) matches the current input symbol (e.g., the third character of the input data stream) with the symbol set (e.g., symbol set 258) of the source STE (e.g., the STE represented by STE symbol 246), the STE represented by STE symbol 248 will also be activated to analyze a fourth character of an input data stream (e.g., a first character of a second multi-character node). Moreover, the process of comparisons and activations of subsequent STEs along transitions 280 and 282 by the STEs represented by STE symbols 248 and 250 can be repeated for the second multi-character node (as well as additional multi-character nodes) in a manner similar to that described above. Likewise, the process of reporting an event (e.g., a result) by the STE represented by STE symbol 252 may also be repeated for the second multi-character node (as well as additional multi-character nodes) in a manner similar to that described above.

In this manner, the automaton of FIG. 13 is able to analyze multi-character nodes. Likewise, the automaton of FIG. 13 can identify multi-character nodes at the start of an input data stream as well as subsequent to the transmission of characters representative of a first multi-character node. It should be noted that the automaton of FIG. 13 analyzes multi-character nodes having three characters therein. However, the same techniques applied to the automaton in FIG. 13 can be applied to multi-character nodes having two characters, four characters, or more characters. Additionally, other automatons may be used in conjunction with or separate from the automaton of FIG. 13.

Figure 14:
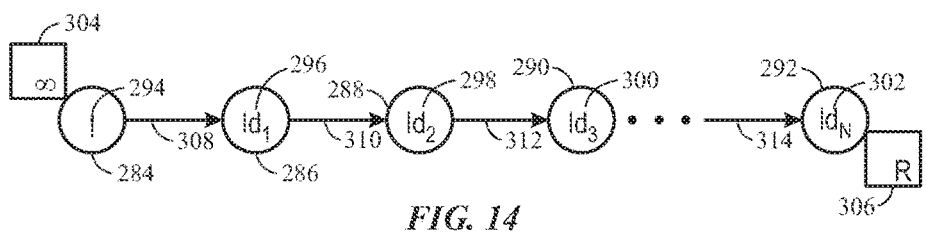
FIG. 14 illustrates a third embodiment of a graphical automaton representation for reporting of an event generated in the automaton.

For example, the automaton of FIG. 14 may search input data that includes a control character (e.g., a designated start symbol) used indicate that transmission of multi-character nodes are starting. The automaton of FIG. 14 includes STE symbols 284, 286, 288, 290, and 292 that may each represent an STE (e.g., respective STEs 34, 36). The STE symbol 284 includes a symbol set 294 "!" representative of a designated start symbol. The STE symbols 286, 288, 290, and 292 each include, respectively, a symbol set 296, 298, 300, and 302 of "$Id_1$," "$Id_2$," "$Id_3$," and "$Id_N$" representative of a multi-character node (e.g., an N-character node). Additionally, the STE represented by STE symbol 284 includes a start indicator 304 (e.g., "∞" as an all-input attribute) while the STE represented by STE symbol 292 is able to generate a report (indicated by report indicator 306) that an event was generated in conjunction with the respective portion of the input data stream being analyzed by the STEs represented by STE symbols 284, 286, 288, 290, and 292 (comprising an N-character node match). It may be understood that the operation of the automaton of FIG. 14 may be representative of the operation and interconnectivity of the underlying respective STEs that correspond to STE symbols 284, 286, 288, 290, and 292.

As illustrated, the STE represented by STE symbol 284 may correspond to a start of node STE. Moreover, each character input as part of the input data transmitted to the STE represented by STE symbol 284 may be compared as the current input symbol against the "!" of symbol set 294 (due to the start indicator 304 that indicates that the STE represented by STE symbol 284 is active in response to all data inputs). If the first character input does not match the "!" of symbol set 294 (e.g., the designated start symbol), no additional processing by the automaton will occur (e.g., the STE represented by STE symbol 286 will not be activated). However, if the first character input matches the "!" of symbol set 294, thus generating an event, the STE represented by STE symbol 284 may activate the respective STE represented by STE symbol 286 as an activate-on-match response. The transition 308 emanating from STE symbol 284 indicates the STE symbol 286 and its underlying STE that will be activated for processing the next character when the source STE (e.g., the STE represented by STE symbol 284) matches the current input symbol (e.g., the first character of the input data stream) with the symbol set (e.g., symbol set 294) of the source STE (e.g., the STE represented by STE symbol 284).

The STE represented by STE symbol 286 may correspond to a first character of a multi-character node (e.g., an N-character node). Accordingly, a first node character input as part of the input data transmitted to the STE represented by STE symbol 286 may be compared as the current input symbol against the "$Id_1$" of symbol set 296. If the first node character input does not match the character stored as the "$Id_1$" of symbol set 296, no additional processing of a second node character of the multi-character node will occur (e.g., the STE represented by STE symbol 288 will not be activated). However, if the first node character input matches the character stored as the "$Id_1$" of symbol set 286, thus generating an event, the STE represented by STE symbol 286 may activate the respective STE represented by STE symbol 288 as an activate-on-match response. The transition 310 emanating from STE symbol 286 indicates the STE symbol 288 and its underlying STE that will be activated for processing the next character when the source STE (e.g., the STE represented by STE symbol 286) matches the current input symbol (e.g., the first node character of the input data stream) with the symbol set (e.g., symbol set 296) of the source STE (e.g., the STE represented by STE symbol 286).

The STE represented by STE symbol 288 may correspond to a second character of a multi-character node (e.g., an N-character node). Accordingly, a second node character input as part of the input data transmitted to the STE represented by STE symbol 288 may be compared as the current input symbol against the "$Id_2$" of symbol set 298 (due to activation of the STE represented by the STE symbol 288 being activated along transition 310). If the second node character input does not match the character stored as the "$Id_2$" of symbol set 298, no additional processing of a third node character of the multi-character node will occur (e.g., the STE represented by STE symbol 290 will not be activated). However, if the second node character input matches the character stored as the "$Id_2$" of symbol set 298, thus generating an event, the STE represented by STE symbol 288 may activate the respective STE represented by STE symbol 290 as an activate-on-match response. The transition 312 emanating from STE symbol 288 indicates the STE symbol 290 and its underlying STE that will be activated for processing the next character when the source STE (e.g., the STE represented by STE symbol 288) matches the current input symbol (e.g., the second node character of the input data stream) with the symbol set (e.g., symbol set 298) of the source STE (e.g., the STE represented by STE symbol 288).

The STE represented by STE symbol 290 may correspond to a third character of a multi-character node (e.g., an N-character node). Accordingly, a third node character input as part of the input data transmitted to the STE represented by STE symbol 290 may be compared as the current input symbol against the "$Id_3$" of symbol set 300 (due to activation of the STE represented by the STE symbol 298 being activated along transition 312). If the third node character input does not match the character stored as the "$Id_3$" of symbol set 300, no additional processing of a fourth or additional node character of the multi-character node will occur (e.g., the STE represented by STE symbol 292 will not be activated). However, if the third node character input matches the character stored as the "$Id_3$" of symbol set 300, thus generating an event, the STE represented by STE symbol 290 may activate the next respective STE (and the process may continue in a similar manner until the STE represented by STE symbol 292 is activated as an activate-on-match response). The transition 314 indicates the STE symbol 292 and its underlying STE that will be activated for processing the Nth character when the source STEs (e.g., the STE represented by STE symbol 290 and any STEs thereafter prior to the STE represented by STE symbol 292) matches the current input symbol (e.g., the respective node character of the input data stream) with the symbol set of the source STE.

Finally, the STE represented by STE symbol 292 may correspond to an Nth character of a multi-character node (e.g., an N-character node). Accordingly, a Nth character input as part of the input data transmitted to the STE represented by STE symbol 292 may be compared as the current input symbol against the "$Id_N$" of symbol set 302 (due to activation of the STE represented by the STE symbol 292 being activated along transition 314). If the Nth character input does not match the character stored as the "$Id_N$" of symbol set 302, no reporting of an event (e.g., result) will occur. However, if the Nth character input matches the character stored as the "$Id_N$" of symbol set 302, thus generating an event, the STE represented by STE symbol 292 may generate a report (indicated by report indicator 306) that an event was generated in conjunction with the respective portion of the input data stream being analyzed by the STEs represented by STE symbols 284, 286, 288, 290, (any additional STEs), and the STE represented by STE symbol 292 (comprising a N-character node match).

Thus, if the N-characters following a control character (e.g., a designated start symbol) of an input data stream generate an event, the reporting of the event can cease processing in the automaton of FIG. 14 and the event (e.g., result) may be transmitted to the host (e.g., processor 12) for characterization and level classification (in a manner similar to that outlined above in conjunction with Table 1). In some embodiments, the N-characters may be eight characters, chosen from a set of characters including capital letters (e.g., A-Z), lowercase letters (e.g., a-z), and numbers (e.g., 0-9). However, the number and type of characters chosen to represent the N-characters may differ from those described above.

Figure 15:
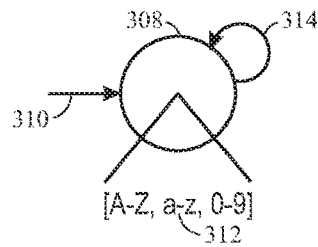
FIG. 15 illustrates a fourth embodiment of a graphical automaton representation for reporting of an event generated in the automaton.

It may be advantageous to transmit multiple edges during a single round or level to the state machine engine 14 for analysis. It may also be advantageous to report all results from respective automatons of the state machine engine 14 at the same time. Accordingly, instead of the STEs represented by STE symbols 234, 236, 264, and 302 generating reports (indicated by report indicators 238, 240, 270, and 306), each result to be indicated can operate to activate a STE represented by STE symbol 308 along transition 310, as illustrated in FIG. 15. The symbol set 312 of STE symbol 308 may include all characters being transmitted (e.g., all capital letters A-Z, lowercase letters a-z, and numbers 0-9). As long as one of these characters is present as a data input, the STE represented by STE symbol 308 will self activate, as illustrated by transition 312. In this manner, the STE represented by STE symbol 308 may operate as a holding STE that operates to "remember" if an automaton had a result transmitted to it. The STE represented by STE symbol 308 may also be utilized with an end of data character in the reporting of that generated result.

Figure 16:
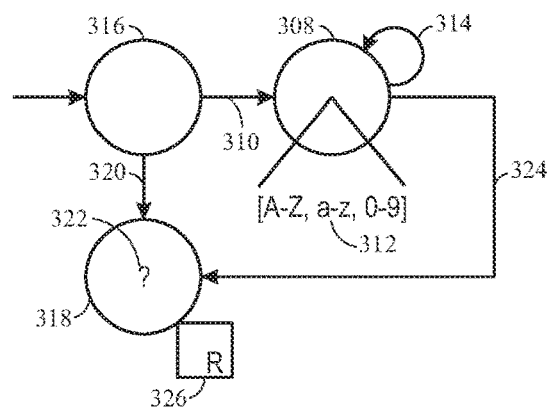
FIG. 16 illustrates a fifth embodiment of a graphical automaton representation for reporting of an event generated in the automaton.

For example, as illustrated in FIG. 16, a STE represented by STE symbol 316 may be representative of any of the STEs represented by STE symbols 234, 236, 264, and 302. However, instead of transmitting a result via result indicator 238, 240, 270, or 306, the STE represented by STE symbol 316 may transmit an activate signal to both the STE represented by STE symbol 308 (along transmission 310) and to the STE represented by STE symbol 318 (along transition 320). The STE represented by STE symbol 318 may include a symbol set 322 of a "?," which may correspond to an end of data character. Once this end of data character is received at the STE represented by STE symbol 322 (having been activated via transition 320 or 324), the STE represented by STE symbol 318 (as indicated by report indicator 326) may report that an event was generated in conjunction with the respective portion of the input data stream being analyzed (comprising either a single or an N-character node match). Through utilization of the automaton reporting illustrated in FIG. 16, all automatons of the state machine engine 14 can report results simultaneously and/or in parallel (e.g., upon receipt of the end of data character at the respective automatons, since each of the automatons analyzes the input data simultaneously).

In some embodiments, a tangible, non-transitory computer-readable medium, such as a hard drive, memory, or the like (e.g., memory 16 or external storage 18 of system 10) may be provided and may store instructions executable by a processor of an electronic device (e.g., by processor 12 of system 10). These instructions may include instructions to represent an automaton configured to generate an event representative of a satisfaction of a portion of a problem of a graph to be solved. Examples of these automatons are illustrated in FIGS. 10-16. However, it may be appreciated that these illustrated graphs are not exclusive and other graphs may be developed and implemented. The instructions may further include instructions to receive an input (e.g., a user input) and simulate operation of an automaton based on the input and/or instructions to generate an indication of a result of the simulation of the operation of the automaton. In this manner, a user (for example) may be able to interface with a visual graph when developing one or more automatons to be used in satisfaction of one or more portions of a graph problem to be solved.

While the various modifications and alternative forms are envisioned, specific embodiments have been shown by way of example in the drawings and have been described in detail herein. However, it should be understood that the embodiments are not intended to be limited to the particular forms disclosed. Rather, the embodiments are to cover all modifications, equivalents, and alternatives falling within the spirit and scope of the following appended claims.

What is claimed is:

1. A state machine engine, comprising:
a plurality of configurable elements programmed to correspond to a graph problem to be solved, wherein the graph problem to be solved comprises a determination of a shortest path from a plurality of paths corresponding to whether a target node as a first configurable element of the plurality of configurable elements is reachable from an origin node as a second configurable element of the plurality of configurable elements, wherein the shortest path between the origin node and the target node from the plurality of paths is determined upon determining that the target node is reachable from the origin node by:
(a) the state machine engine receiving a list of nodes as a query string from a processor, wherein the query string is at least a part of an input data stream transmitted to the state machine engine, wherein each node of the list of nodes corresponds to a respective character of a set of characters;
(b) each automaton comprising a portion of the plurality of configurable elements within the state machine engine evaluating whether or not it contains an edge that originates on one of the nodes in the query string;
(c) when an automaton does match this condition, reporting via the automaton a destination node of an edge it represents, wherein the destination node corresponds to a first character of the set of characters, to allow the processor to begin at any arbitrary node as the origin node to determine what nodes can be reached from the origin node;
(d) returning a list of nodes that can be reached from a set of query nodes as the origin node and/or additionally provided nodes from the state machine engine to the processor as destination nodes having a corresponding level associated with a maximum number of hops undertaken to reach the destinations nodes;
(e) utilizing a set of one-hop reachable nodes to deliver to the state machine engine as a new query for analysis;

(f) porting from the state machine engine a set of nodes reachable from the one-hop reachable nodes as representative of two-hop reachable nodes; and (g) discovering new nodes reachable at increasingly greater distances from the origin node until the processor finds the target node within a result set or the state machine engine returns an empty result set indicating the target node is not reachable from the origin node; and wherein, each configurable element of the plurality of configurable elements comprising a state transition element (STE) comprising a memory cell programmed with configuration data to selectively set a state of the memory cell to a binary high value or a binary low value, wherein the STE is configured to analyze at least a portion of the input data stream based on the state of the memory cell and to output a result of the analysis as an event representative of a satisfaction of traversal of a portion of the graph problem to be solved based on the at least a portion of the input data stream, wherein the STE is configured to represent a node of a graph edge as the portion of the graph problem to be solved, wherein the STE evaluates the at least a portion of the input data stream to determine whether the node matches the at least a portion of the input data stream, wherein the STE is configured to report the node of the graph edge as the result of the analysis upon an occurrence of the node of the graph edge matching the at least a portion of the input data stream.

2. The state machine engine of claim 1, wherein the STE is configured to report the event representative of the satisfaction of traversal of the portion of the graph problem to be solved based on a match of the at least a portion of the input data stream with a stored value as the state of the memory cell.

3. The state machine engine of claim 1, wherein the STE is configured to report only one instance of the event representative of the satisfaction of traversal of the portion of the graph problem to be solved.

4. The state machine engine of claim 1, comprising a second STE, wherein the second STE comprises a second memory cell programmed with second configuration data to selectively set a state of the second memory cell to a binary high value or a binary low value, wherein the second STE is configured to analyze at least a second portion of the input data stream based on the state of the second memory cell and to output a second result of the analysis as an event representative of a satisfaction of a traversal of a second portion of the graph problem to be solved based on the second portion of the input data stream.

5. The state machine engine of claim 1, wherein the STE is configured to report the event representative of the satisfaction of traversal of the portion of the graph problem to be solved to a host device coupled to the state machine engine.

6. The state machine engine of claim 1, wherein the STE is configured to analyze the at least a portion of the input data stream to match a character present in the input data stream with a programmed value as the configuration data of the STE.

7. The state machine engine of claim 1, wherein at least one configurable element of the plurality of configurable elements is utilized in analysis of the input data stream until an end of data signal is received.

8. The state machine engine of claim 1, wherein the STE is configured to report the event when an end of data signal in the input data stream is received.

9. A device, comprising:

a processor when in operation transmits an input data stream to be analyzed by a plurality of configurable elements programmed to correspond to a graph problem to be solved, wherein the graph problem to be solved comprises a determination of a shortest path from a plurality of paths corresponding to whether a target node as a first configurable element of the plurality of configurable elements is reachable from an origin node as a second configurable element of the plurality of configurable elements, wherein the shortest path between the origin node and the target node from the plurality of paths is determined upon determining that the target node is reachable from the origin node by:

(a) a state machine engine comprising the plurality of configurable elements receiving a list of nodes as a query string from the processor, wherein the query string is at least a part of the input data stream transmitted to the state machine engine, wherein each node of the list of nodes corresponds to a character;

(b) each automaton comprising a portion of the plurality of configurable elements within the state machine engine evaluating whether or not it contains an edge that originates on one of the nodes in the query string;

(c) when an automaton does match this condition, reporting via the automaton a destination node of an edge it represents, wherein the destination node corresponds to a first character of a set of characters, to allow the processor to begin at any arbitrary node as the origin node to determine what nodes can be reached from the origin node;

(d) returning a list of nodes that can be reached from a set of query nodes as the origin node and/or additionally provided nodes from the state machine engine to the processor as destination nodes having a corresponding level associated with a maximum number of hops undertaken to reach the destinations nodes;

(e) utilizing a set of one-hop reachable nodes to deliver to the state machine engine as a new query for analysis;

(f) reporting from the state machine engine a set of nodes reachable from the one-hop reachable nodes as representative of two-hop reachable nodes; and (g) discovering new nodes reachable at increasingly greater distances from the origin node until the processor finds the target node within a result set or the state machine engine returns an empty result set indicating the target node is not reachable from the origin node; and wherein, each configurable element of the plurality of configurable elements comprising a state transition element (STE) comprising a memory element programmed with configuration data to selectively set a data state of the memory element as one of a high state and a low state, wherein the STE is configured to analyze at least a portion of the input data stream based on the data state of the memory element and to output a result of the analysis as an event, wherein the STE is configured to represent a node of a graph edge as the portion of the graph problem to be solved, wherein the STE evaluates the at least a portion of the input data stream to determine whether the node matches the at least a portion of the input data stream, wherein the STE is configured to report the node of the graph edge as the event upon an occurrence of the node matching the at least a portion of the input data stream, wherein the processor when in operation receives a report of the event representative of a satisfaction of traversal of a portion of a graph problem to be solved based on the at least a portion of the input data stream.

10. The device of claim 9, wherein the processor when in operation identifies the report as corresponding to a respective edge and a respective node of the graph problem to be solved.

11. The device of claim 10, wherein the processor when in operation transmits a second portion of the input data stream to be analyzed by a second STE based on the graph problem to be solved.

12. The device of claim 10, comprising a memory coupled to the processor, wherein the processor when in operation categorizes the report and stores the categorized report in the memory.

13. A device, comprising:
a state transition element (STE), wherein the STE comprises a memory element programmed with configuration data corresponding to programming a portion of a graph problem to be solved, wherein the graph problem to be solved comprises a determination of a shortest path from a plurality of paths corresponding to whether a target node as a first configurable element of a plurality of configurable elements is reachable from an origin node as a second configurable element of the plurality of configurable elements, wherein the shortest path between the origin node and the target node from the plurality of paths is determined upon determining that the target node is reachable from the origin node by:
(a) a state machine engine comprising the plurality of configurable elements receiving a list of nodes as a query string from a processor, wherein the query string is at least a part of an input data stream transmitted to the state machine engine, wherein each node of the list of nodes corresponds to a respective character of a set of characters;
(b) each automaton comprising a portion of the plurality of configurable elements within the state machine engine evaluating whether or not it contains an edge that originates on one of the nodes in the query string;
(c) when an automaton does match this condition, reporting via the automaton a destination node of an edge it represents, wherein the destination node corresponds to a first character of the set of characters, to allow the processor to begin at any arbitrary node as an origin node to determine what nodes can be reached from the origin node;
(d) returning a list of nodes that can be reached from a set of query nodes as the origin node and/or additionally provided nodes from the state machine engine to the processor as destination nodes having a corresponding level associated with a maximum number of hops undertaken to reach the destinations nodes;
(e) utilizing a set of one-hop reachable nodes to deliver to the state machine engine as a new query for analysis;
(f) reporting from the state machine engine a set of nodes reachable from the one-hop reachable nodes as representative of two-hop reachable nodes; and
(g) discovering new nodes reachable at increasingly greater distances from the origin node until the processor finds the target node within a result set or the state machine engine returns an empty result set indicating the target node is not reachable from the origin node; and
wherein the configuration data sets a data state of the memory element as one of a high state and a low state, wherein the STE is configured to analyze portions of the input data stream based on the data state of the memory element and to output a result of the analysis as and generate an indication of an event representative of satisfaction of traversal of a portion of the graph problem to be solved based on the portions of the input data stream, wherein the STE is configured to represent a node of a graph edge as the portion of the graph problem to be solved, wherein the STE evaluates the portions of the input data stream to determine whether the node matches the portions of the input data stream, wherein the STE is configured to report the node of the graph edge as the result of the analysis upon an occurrence of the node matching the portions of the input data stream.

14. The device of claim 13, comprising a second STE, wherein the second STE is configured to analyze second portions of the input data stream and generate an indication of a second event representative of satisfaction of traversal of a second portion of the graph problem to be solved.

15. The device of claim 14, wherein the STE and the second STE are configured to transmit the indication of the event and the indication of the second event, respectively, in parallel.

16. The device of claim 14, wherein the STE and the second STE are configured to transmit the indication of the event and the indication of the second event, respectively, in response to receipt of an end of data character at the STE and the second STE.

17. The device of claim 13, wherein the STE is configured to analyze the portions of the input data stream via comparison of a character present in the portions of the input data stream with a stored value as the data state in the STE.

18. The device of claim 17, wherein the STE is configured to generate the indication of the event based on the comparison of the character present in the portions of the input data stream with the stored value as the data state in the STE.

19. The device of claim 17, wherein the STE comprises a second STE, wherein the second STE is configured analyze the portions of the input data stream via comparison of a second character present in the portions of the input data stream with a stored value as a second data state in the second STE.

20. The device of claim 19, wherein the STE is configured to store a first portion of a node identification value of a node of the graph as the stored value in the STE.

21. The device of claim 20, wherein the second STE is configured to store a second portion of the node identification value of the node of the graph as the stored value in the second STE.

22. The device of claim 13, comprising a host processor coupled to the STE, wherein the host processor is configured to receive the indication of the event generated by the STE.

23. The device of claim 22, wherein the host processor is configured to generate a second data stream and transmit the second data stream to the STE for analysis.

24. The device of claim 23, wherein the host processor is configured to generate the second data stream based upon the indication of the event generated by the STE.

25. A device, comprising:
a memory configured to store instructions executable by the device, wherein the instructions comprise a compiler configured to a program a plurality of state transition elements (STEs) of a finite state machine lattice to correspond to a graph problem to be solved, wherein the graph problem to be solved comprises a determination of a shortest path from a plurality of paths corresponding to whether a target node as a first configurable element of a plurality of configurable elements is reachable from an origin node as a second configurable element of the plurality of configurable elements by:
- (a) a state machine engine comprising the plurality of configurable elements receiving a list of nodes as a query string from a processor, wherein the query string is at least a part of an input data stream transmitted to the state machine engine, wherein each node of the list of nodes corresponds to a respective character of a set of characters;
- (b) each automaton comprising a portion of the plurality of configurable elements within the state machine engine evaluating whether or not it contains an edge that originates on one of the nodes in the query string;
- (c) when an automaton does match this condition, reporting via the automaton a destination node of an edge it represents, wherein the destination node corresponds to a first character of the set of characters, to allow the processor to begin at any arbitrary node as the origin node to determine what nodes can be reached from the origin node;
- (d) returning a list of nodes that can be reached from a set of query nodes as the origin node and/or additionally provided nodes from the state machine engine to the processor as destination nodes having a corresponding level associated with a maximum number of hops undertaken to reach the destinations nodes;
- (e) utilizing a set of one-hop reachable nodes to deliver to the state machine engine as a new query for analysis;
- (f) reporting from the state machine engine a set of nodes reachable from the one-hop reachable nodes as representative of two-hop reachable nodes; and
- (g) discovering new nodes reachable at increasingly greater distances from the origin node until the processor finds the target node within a result set or the state machine engine returns an empty result set indicating the target node is not reachable from the origin node; and wherein the shortest path between the origin node and the target node from the plurality of paths is determined upon determining that the target node is reachable from the origin node, wherein each STE of the plurality of STEs is programmed with a respective stored value representative of an identification of a node of the graph problem to be solved for comparison against a character in the input data stream, wherein each STE of the plurality of STEs is configured to report the node as a result of an analysis of a portion of the graph problem to be solved upon an occurrence of the identification matching the character in the input data stream.

26. The device of claim 25, wherein the compiler is configured to program the finite state machine lattice by generating a binary image of high and low bits for storage in memory cells of the finite state machine lattice as the stored value.

27. The device of claim 26, where in the compiler is configured to reprogram the finite state machine lattice by generating a second binary image of high and low bits for storage in the memory cells of the finite state machine lattice as the stored value subsequent to generation of a match in the state machine lattice based on the comparison.

28. A tangible, non-transitory computer-readable medium configured to store instructions executable by a processor of an electronic device, wherein the instructions comprise instructions to represent a plurality of configurable elements programmed to correspond to a graph problem to be solved, wherein the graph problem to be solved comprises a determination of a shortest path from a plurality of paths corresponding to whether a target node as a first configurable element of the plurality of configurable elements is reachable from an origin node as a second configurable element of the plurality of configurable elements, wherein the shortest path between the origin node and the target node from the plurality of paths is determined upon determining that the target node is reachable from the origin node by:
- (a) a state machine engine comprising the plurality of configurable elements receiving a list of nodes as a query string from the processor, wherein the query string is at least a part of an input data stream transmitted to the state machine engine, wherein each node of the list of nodes corresponds to a respective character of a set of characters;
- (b) each automaton comprising a portion of the plurality of configurable elements within the state machine engine evaluating whether or not it contains an edge that originates on one of the nodes in the query string;
- (c) when an automaton does match this condition, reporting via the automaton a destination node of an edge it represents, wherein the destination node corresponds to a first character of the set of characters, to allow the processor to begin at any arbitrary node as the origin node to determine what nodes can be reached from the origin node;
- (d) returning a list of nodes that can be reached from a set of query nodes as the origin node and/or additionally provided nodes from the state machine engine to the processor as destination nodes having a corresponding level associated with a maximum number of hops undertaken to reach the destinations nodes;
- (e) utilizing a set of one-hop reachable nodes to deliver to the state machine engine as a new query for analysis;
- (f) reporting from the state machine engine a set of nodes reachable from the one-hop reachable nodes as representative of two-hop reachable nodes; and
- (g) discovering new nodes reachable at increasingly greater distances from the origin node until the processor finds the target node within a result set or the state machine engine returns an empty result set indicating the target node is not reachable from the origin node; and wherein, each configurable element of the plurality of configurable elements comprising a state transition element (STE) comprising a memory element programmed with configuration data to selectively set a data state of the memory element as one of a high state and a low state, wherein the STE is configured to analyze at least a portion of the input data stream based on the data state of the memory element and to output a result of the analysis as an event representative of a satisfaction of traversal of a portion of the graph problem to be solved, wherein the STE is configured to represent a node of a graph edge as the portion of the graph problem to be solved, wherein the STE evaluates the at least a portion of the input data stream to determine whether the node matches the at least a portion of the input data stream, wherein the STE is configured to report the node of the graph edge as the result of the analysis upon an occurrence of the node matching the at least a portion of the input data stream.

29. The computer-readable medium of claim 28, comprising instructions to receive an input and simulate operation of the STE based on the input.

30. The computer-readable medium of claim 29, comprising instructions to generate an indication of a result of the simulation of the operation of the STE.

\* \* \* \* \*

UNITED STATES PATENT AND TRADEMARK OFFICE
CERTIFICATE OF CORRECTION

PATENT NO. : 12,197,510 B2
APPLICATION NO. : 15/692972
DATED : January 14, 2025
INVENTOR(S) : Jeffery M. Tanner Page 1 of 1

It is certified that error appears in the above-identified patent and that said Letters Patent is hereby corrected as shown below:

On the Title Page

Item (54) and in the Specification, Column 1, Lines 1-3, the title should read:
"TRAVERSAL OF A PORTION OF A GRAPH PROBLEM TO BE SOLVED USING AUTOMATA PROCESSOR".

Signed and Sealed this
Seventeenth Day of June, 2025

Coke Morgan Stewart
*Acting Director of the United States Patent and Trademark Office*